10 MICRONS

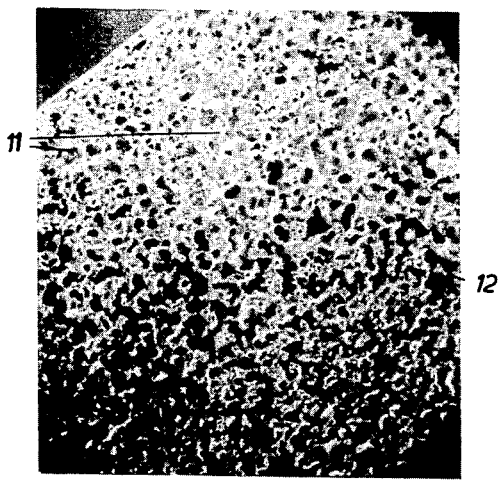
FIG. 1.    200 MICRONS
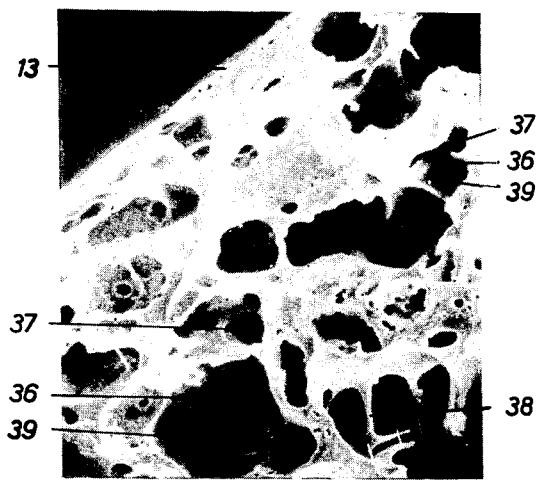
FIG. 2.    20 MICRONS
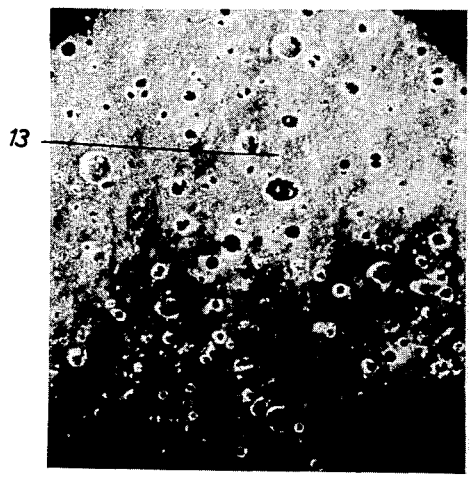
FIG. 3.    60 MICRONS
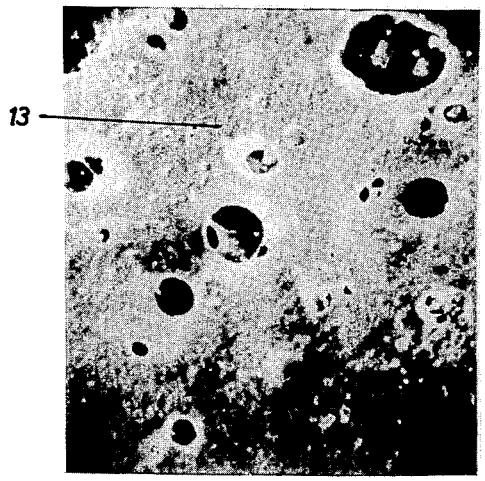
FIG. 4.    20 MICRONS

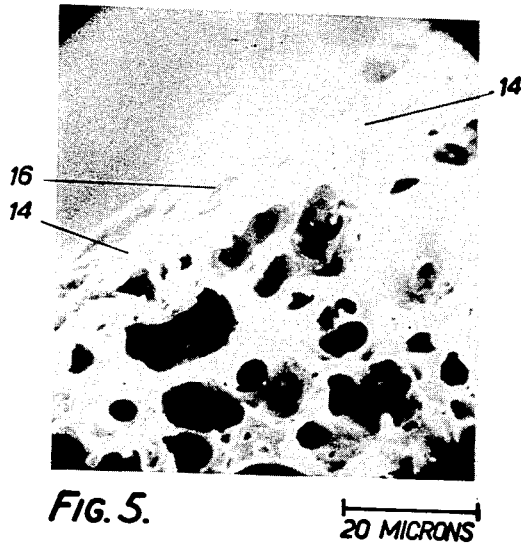
FIG. 5.  20 MICRONS
FIG. 7.  200 MICRONS
FIG. 6.  10 MICRONS
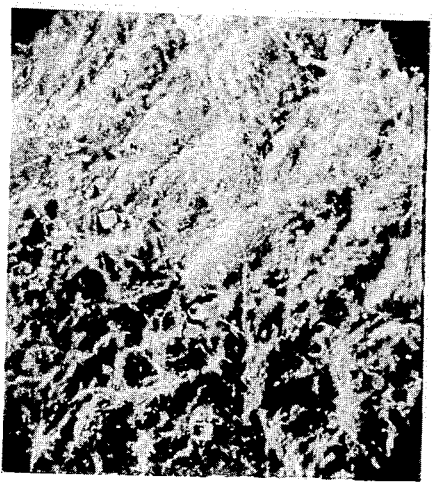
FIG. 8.  60 MICRONS

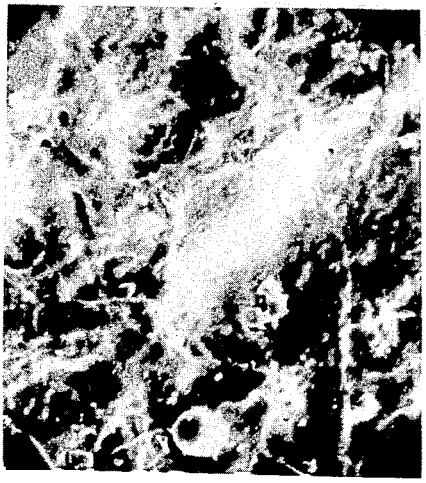
FIG. 9.    ⊢———⊣ 20 MICRONS
FIG. 10.    ⊢———⊣ 200 MICRONS
FIG. 11.    ⊢———⊣ 60 MICRONS
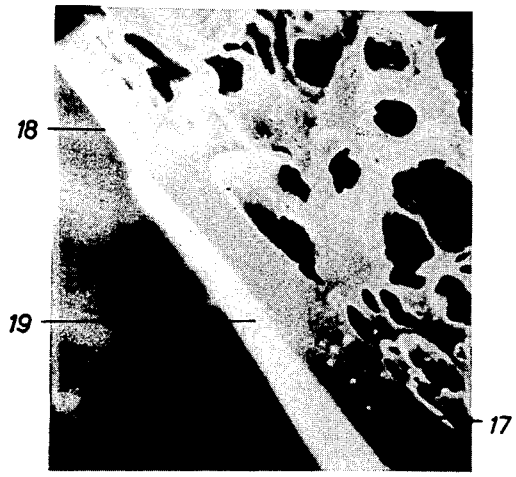
FIG. 12.    ⊢———⊣ 20 MICRONS

FIG. 13.  |———| 10 MICRONS
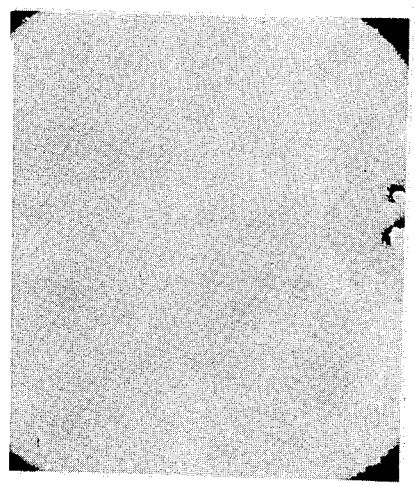
FIG. 15.  |———| 60 MICRONS
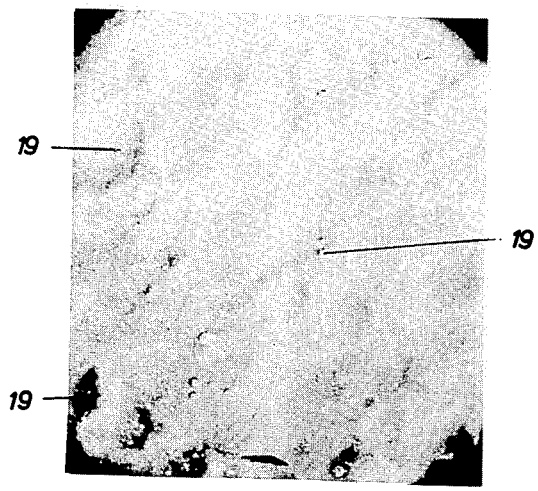
FIG. 14.  |———| 200 MICRONS
FIG. 16.  |———| 20 MICRONS

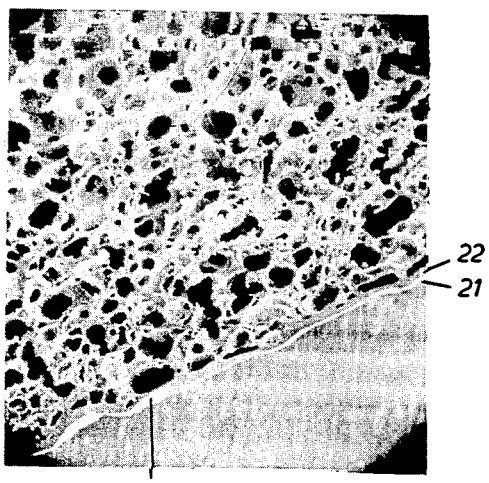
FIG. 17.  100 MICRONS
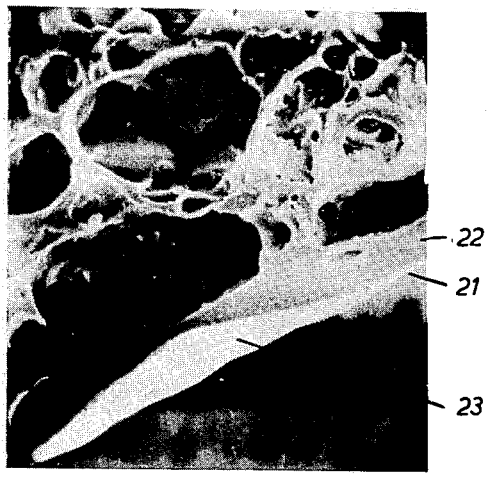
FIG. 18.  20 MICRONS
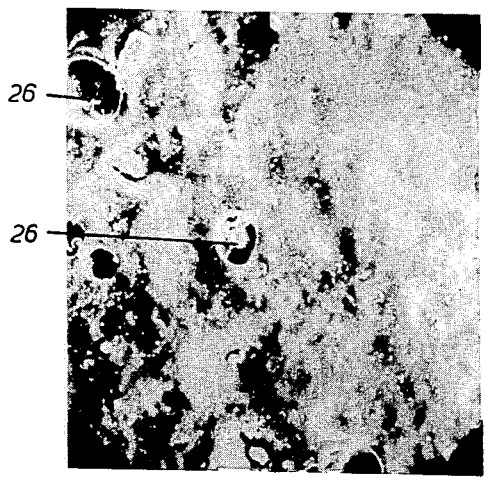
FIG. 19.  60 MICRONS
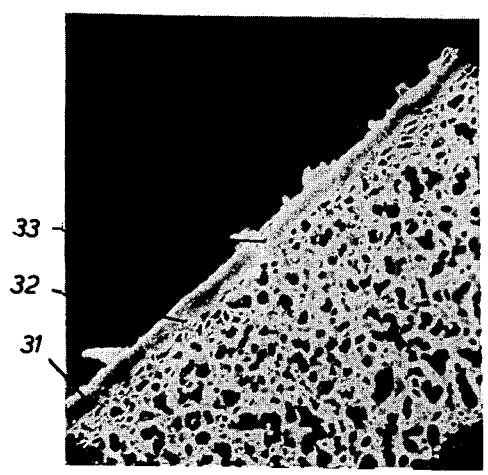
FIG. 20.  100 MICRONS

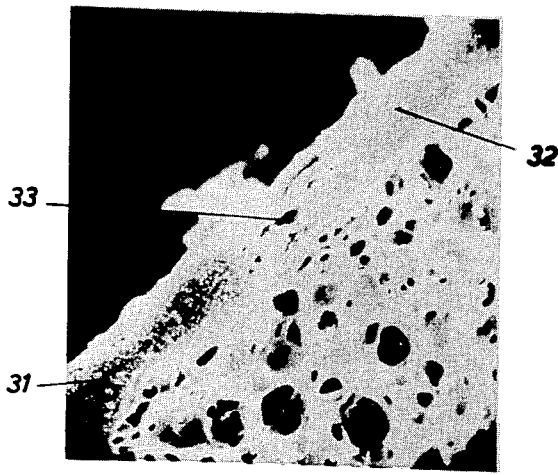
FIG. 21.  |⎯⎯⎯⎯| 30 MICRONS
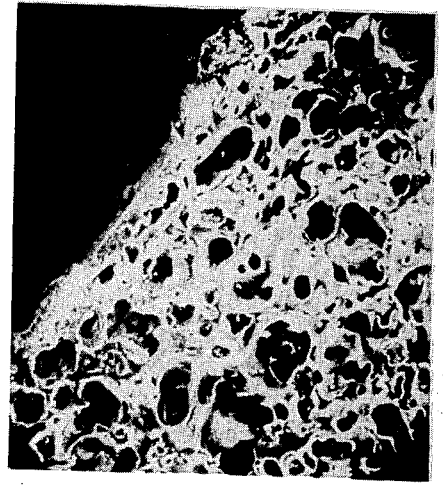
FIG. 23.  |⎯⎯⎯⎯| 30 MICRONS
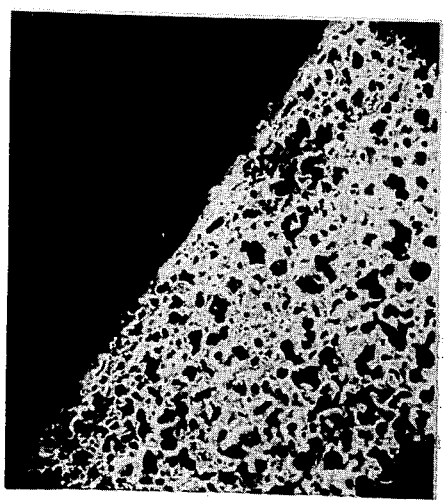
FIG. 22.  |⎯⎯⎯⎯| 100 MICRONS
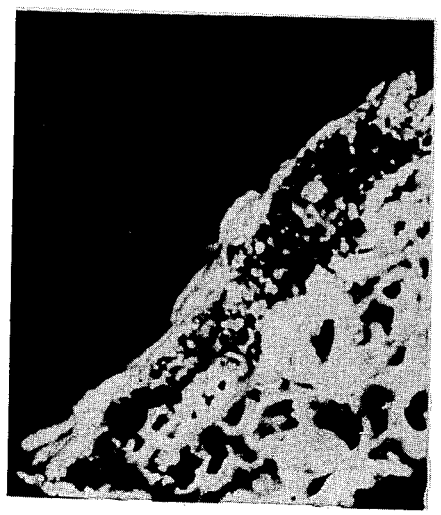
FIG. 24.  |⎯⎯⎯⎯| 10 MICRONS

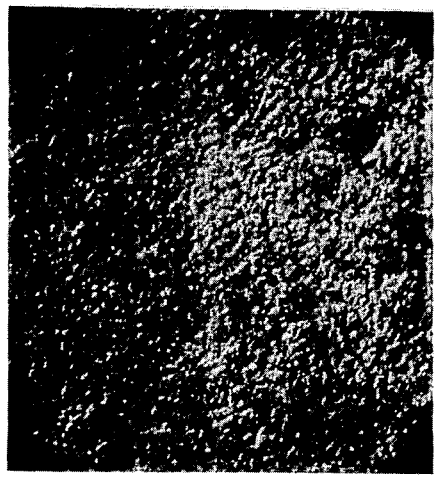
FIG. 25.   ⊢——⊣ 600 MICRONS
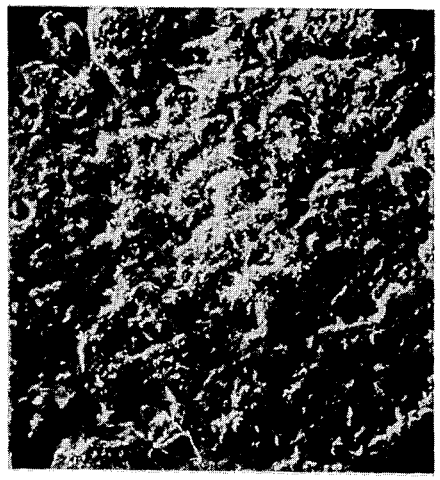
FIG. 26.   ⊢——⊣ 100 MICRONS
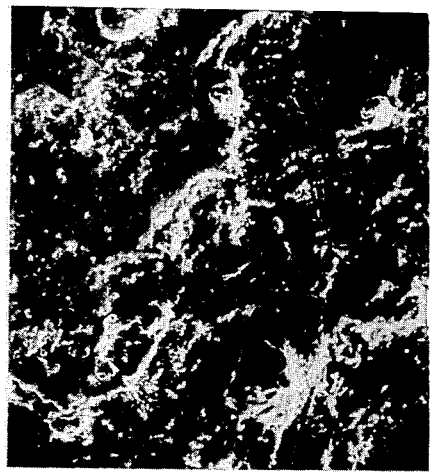
FIG. 27.   ⊢——⊣ 30 MICRONS
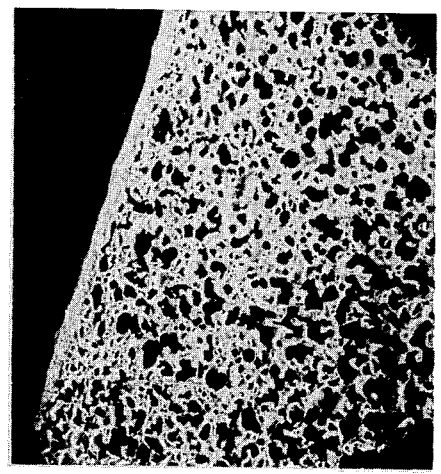
FIG. 28.   ⊢——⊣ 100 MICRONS

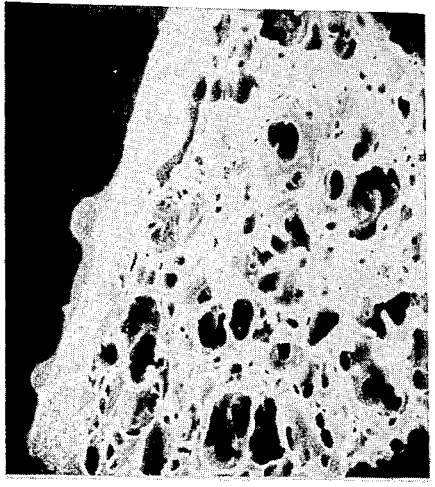
FIG. 29.   30 MICRONS
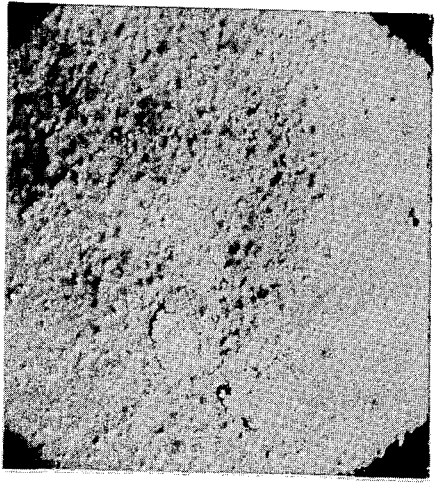
FIG. 31.   600 MICRONS
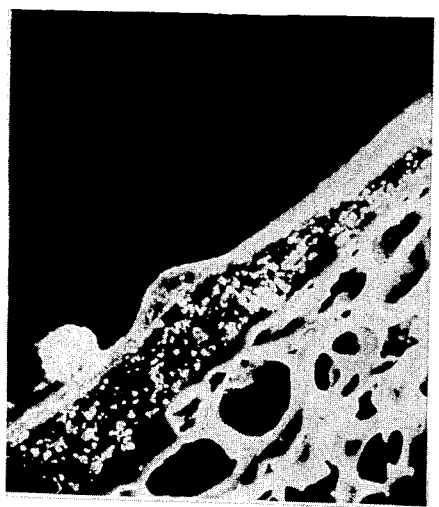
FIG. 30.   10 MICRONS
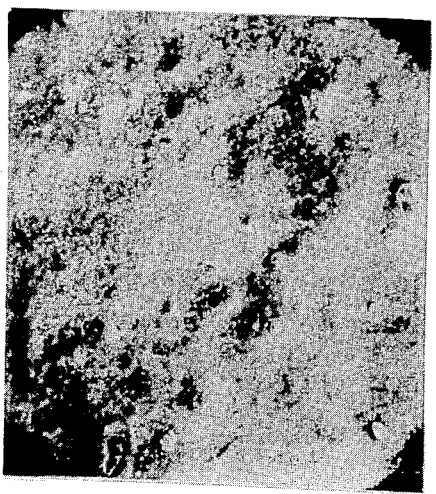
FIG. 32.   100 MICRONS

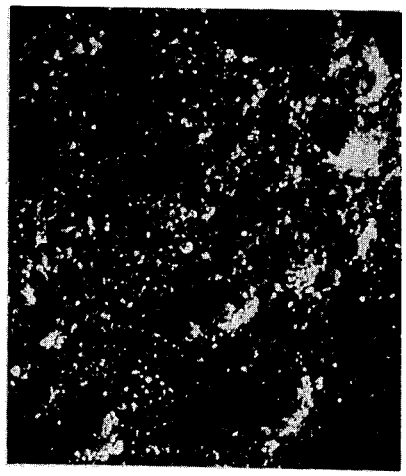
FIG.33.  |———————|
30 MICRONS
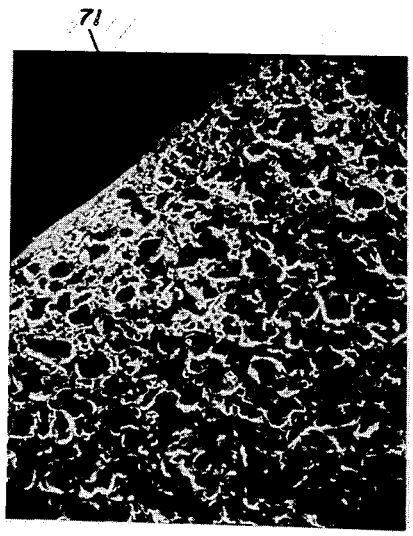
FIG.34.  |———————|
100 MICRONS

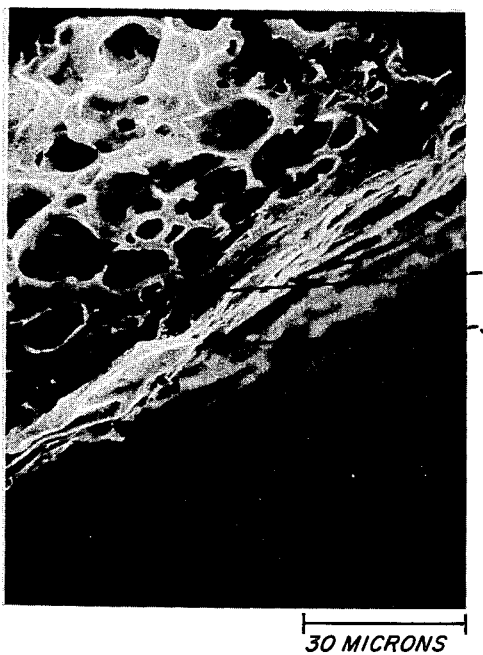
FIG. 42 ⊢30 MICRONS⊣
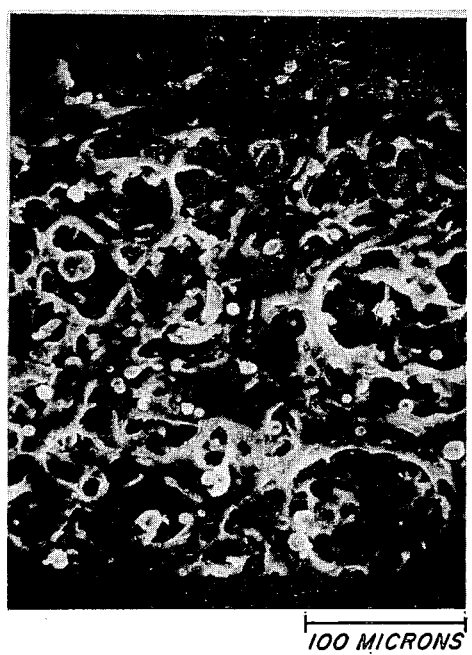
FIG. 43 ⊢100 MICRONS⊣
FIG. 44 ⊢30 MICRONS⊣
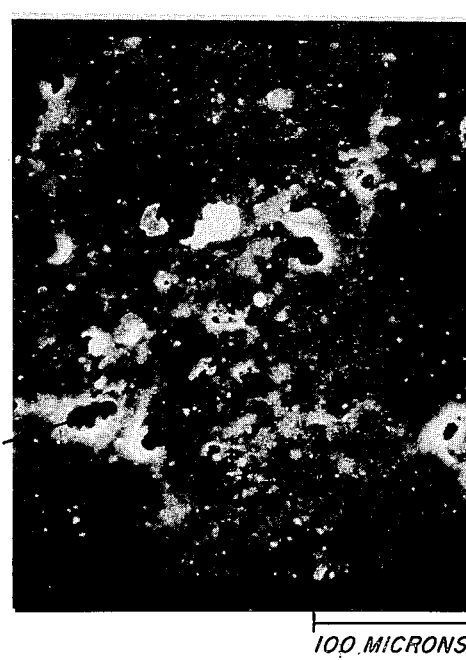
FIG. 45 ⊢100 MICRONS⊣

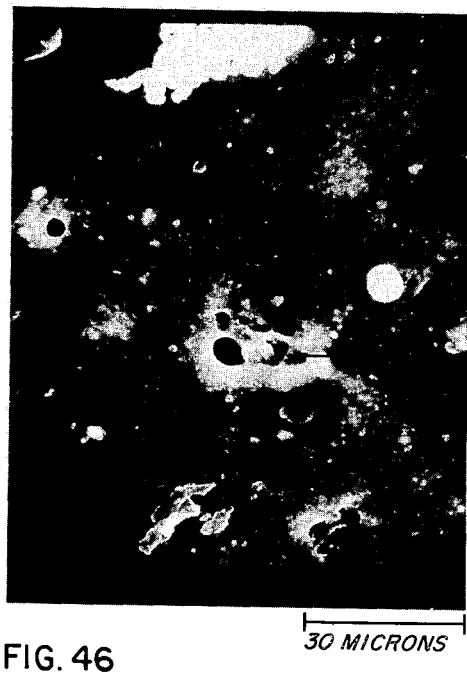
FIG. 46  30 MICRONS
FIG. 47  30 MICRONS
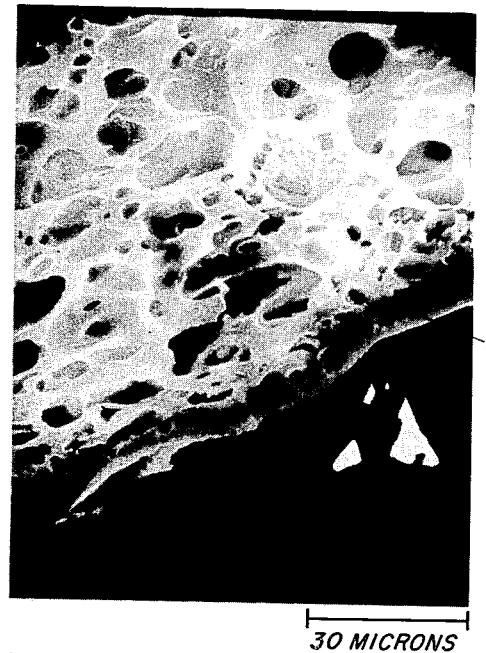
FIG. 48  30 MICRONS
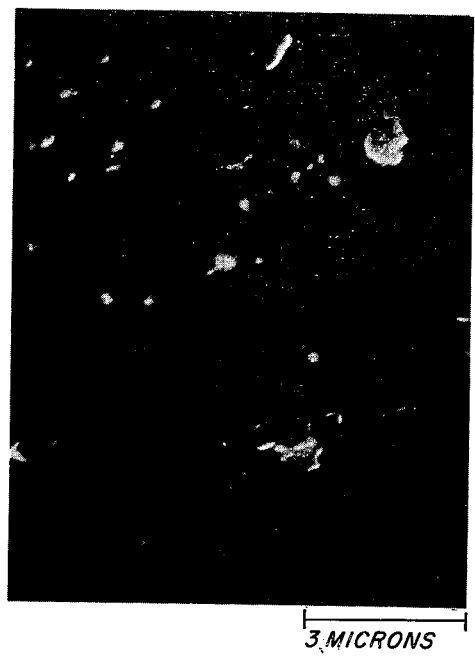
FIG. 49  3 MICRONS

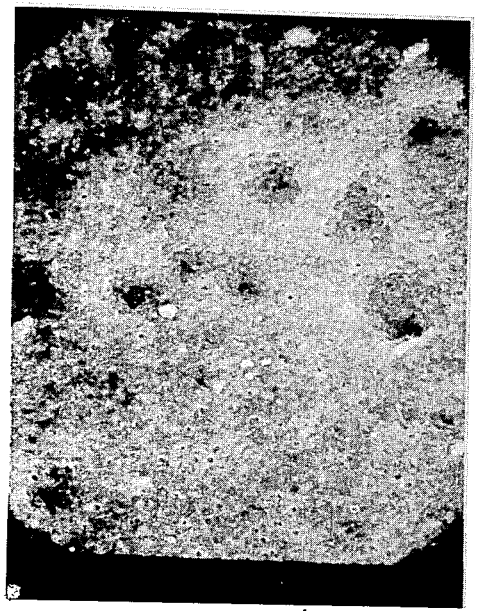
FIG. 50  30 MICRONS
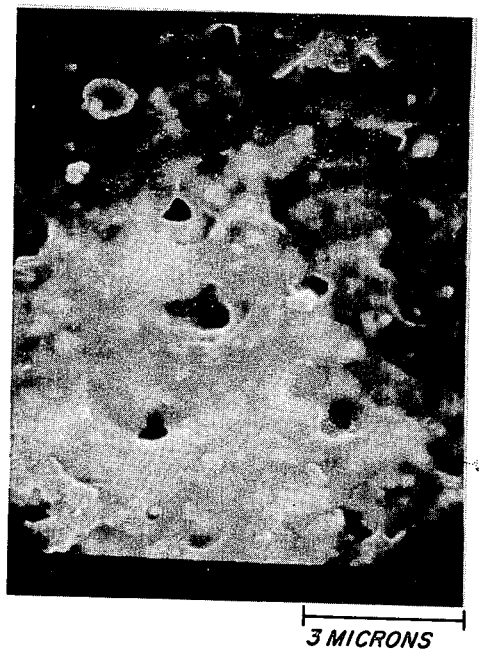
FIG. 51  3 MICRONS
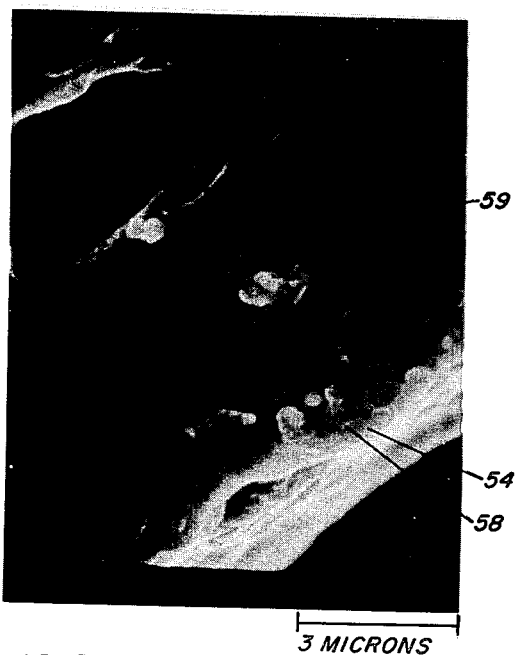
FIG. 52  3 MICRONS
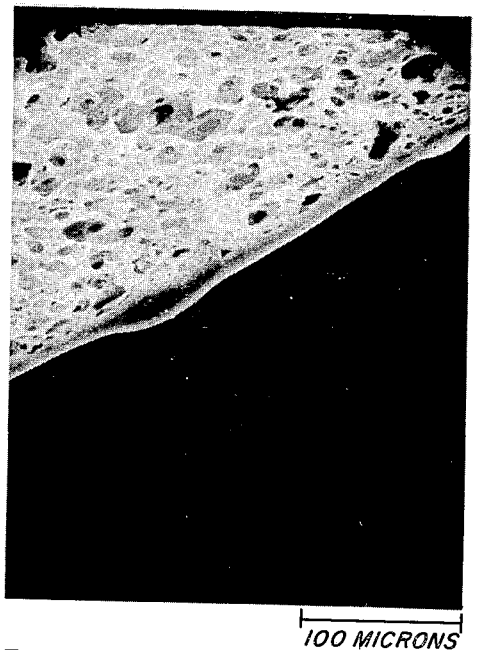
FIG. 53  100 MICRONS

FIG. 54 30 MICRONS
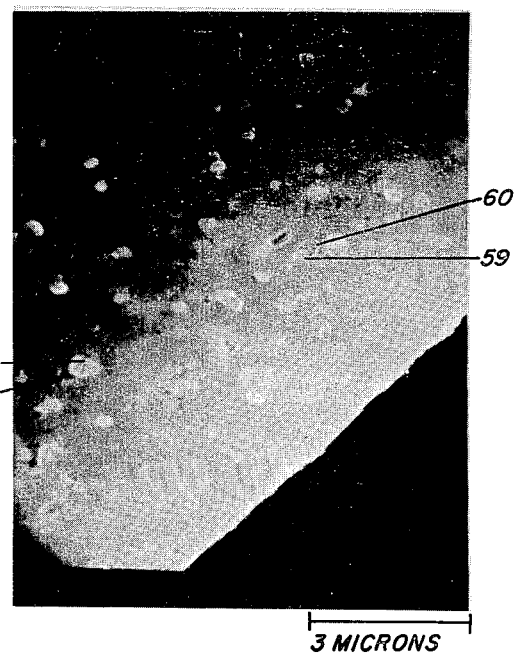
FIG. 55 3 MICRONS
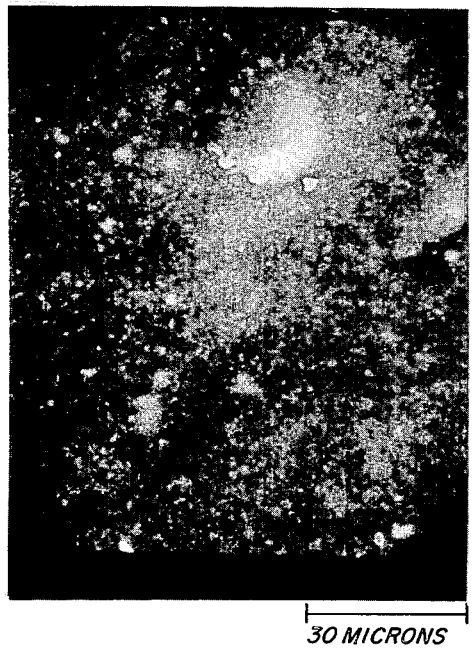
FIG. 56 30 MICRONS
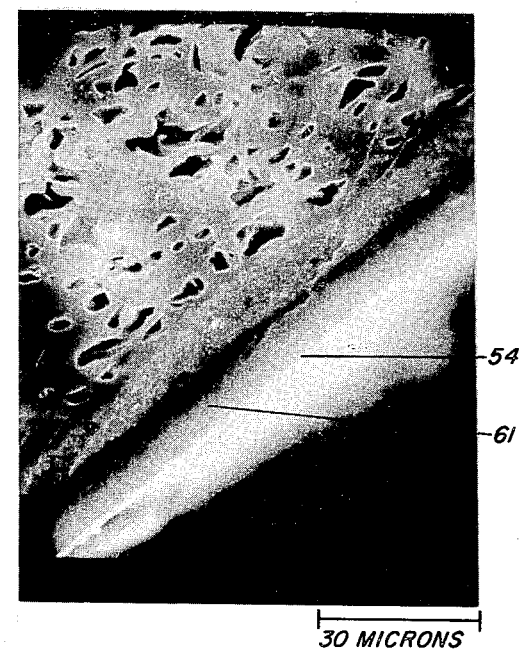
FIG. 57 30 MICRONS

3 MICRONS

100 MICRONS

30 MICRONS

United States Patent Office 3,764,363
Patented Oct. 9, 1973

3,764,363
SURFACE TREATMENT OF MICROPOROUS SURFACE OF SHEET MATERIAL AND PRODUCT PRODUCED
Frank Peter Civardi, Wayne, N.J., and Hans Georg Kuenstler, Whitestone, N.Y., assignors to Inmont Corporation, New York, N.Y.
Continuation-in-part of applications Ser. No. 843,425, July 22, 1969, and Ser. No. 867,762, Oct. 20, 1969. This application July 21, 1970, Ser. No. 56,936
Int. Cl. B32b 5/18; B44c 1/20; B44d 1/14
U.S. Cl. 117—10
48 Claims

ABSTRACT OF THE DISCLOSURE

A sheet material having a microporous surface of elastomeric polyurethane is treated to produce a sheet, which has greater waterproofness and still transmits water vapor, by applying to it a coagulated layer of elastomeric polyurethane. Preferably the coagulated layer is produced by applying a pigmented polyurethane solution to the sheet while it is wet with a non-solvent. The coagulated layer may then be treated in various ways; e.g. it may be embossed or treated with a solvent to form a fused glossy moisture vapor-transmitting surface. The product is suitable for use as a leather substitute in shoe uppers.

---

This application is a continuation-in-part of our applications Ser. Nos. 843,425 filed July 22, 1969 now abandoned and 867,762 filed Oct. 20, 1969 now abandoned.

The present invention relates to surface treatment of microporous polymer sheet material especially elastomeric polyurethane material.

In the manufacture of microporous polymer sheets suitable for use as shoe upper material in place of natural leather it has been suggested that the surface of the sheet (having a microporous polyurethane upper layer) be given a polyurethane finish. One process of this type is described in such U.S. patents as Craven et al. Pat. Nos. 3,481,766 and 3,481,767 and Hochberg et al. Pat. No. 3,501,326. In this type of process the polymer (such as polyurethane) is applied in a solvent which is a nonsolvent for the microporous polyurethane layer. As Pat. No. 3,481,767 states:

"A polyurethane polymer finish composition can be applied . . . However, a problem arises when the polyurethane polymer finish composition is applied to the microporous polyurethane sheet material. The solvents used in the finish composition tend to soften and collapse the microporous polymeric structure of the sheet, thereby rendering it impermeable or substantially impermeable and making the material useless as a leather replacement in shoes."

The patentees state that, in their invention,

"The primary requirement for the solvent used for the finish composition is that it does not materially attack and degrade the microporous polyurethane polymer of the sheet material thereby causing complete collapse of the microporous structure or substantially reducing the water vapour permeability of the sheet. Therefore, the solvent must selectively dissolve the polyurethane polymer used for the finish but must be substantially inert to the microporous substrate."

This requirement of course stringently limits the type of polyurethane that can be used in the finish (e.g. with respect to molecular weight and chemical and physical constitution), since the finish polyurethane must be of a type that is soluble in rather weak solvents. In such a process there are also necessarily, important practical restrictions on the characteristics of the finishing solution (e.g. with respect of concentration and viscosity) and on the coverage of the surface, especially when a relatively open microporous layer is to be finished.

It has also been suggested (French patent, 1,522,739) that the surface of the sheet (having a microporous polyurethane upper layer) be sprayed with solvent droplets so as to partially collapse the porous structure of the plastic at the surface and produce a surface whose appearance resembles natural leather and to impart to the surface an increased resistance to the ingress of liquid water through the treated surface, an increased abrasion resistance and reduced surface pore size with a reduction in the soiling tendency, while darkening the colour of the surface and imparting a leatherlike "break" and "grain" like that of calf leather. ("Break" is defined in ASTM Designation D.151760) "Standard Definitions of Terms Relating to Leather" as "The superficial wrinkling formed when the leather is bent, grain inward, with a radius of curvature like that formed at the vamp of a shoe in walking. 'Fine brake'—up to 20 wrinkles per inch—is an indication of good quality.") In one convenient way of carrying out the process the microporous sheet passes underneath a spray nozzle from which the solvent e.g. N,N-dimethylformamide ("DMF") is sprayed as fine droplets and then directly under a blast of hot air impinging on the surface (e.g. at a temperature in the range of 40–100° C.). The surface takes on a much shinier and (when the sheet material carries a black pigment or dye) a much blacker appearance; this is thought to be due to a heat-induced fusion or flow of the surface blend of the solvent and the polymeric material of the sheet, which blend has a lower melting point than that of the polymeric material alone. Besides giving the sheet an improved appearance and "break" this type of process also increases the waterproofness of the material (as measured by conventional tests, in which the material is flexed in contact with liquid water until the water penetrates from the "grain" to the "flesh" side). It does, however, decrease its water vapour transmission and, when one attempts to raise the waterproofness to relatively high levels by applying greater amounts of solvent spray, the water vapour transmission is generally reduced to a level which makes the material unacceptable for commercial use in many types of shoe uppers.

In accordance with one aspect of the present invention it has been found that the waterproofness of the material can be increased still further, while maintaining the water vapour transmission at an acceptable level, if, prior to the spraying with the solvent droplets, the surface of the microporous sheet material is sprayed, printed or otherwise coated, with a solution of an elastomeric polyurethane material in a solvent therefor while the sheet material is wet with a non-solvent for the polyurethane material. This deposits a layer of polyurethane material on the surface of the sheet material, presumably due to precipitation or coagulation of the polyurethane material by the action of the non-solvent at said surface. When, after drying this coagulated layer, the solvent (which may have a small amount of polymer and pigment mixed therewith) is then sprayed onto the coagulated layer and heat is applied, the upper surface becomes glossy, with a fine calf grain and a good "break."

On examination with a scanning electron microscope the coagulated layer, (after drying of course) is found to have at most only a minor proportion (e.g. less than 20% or 10% or even less than 5%). of its volume occupied by pores whose diameter is above 0.3 micron. Typical photomicrographs (obtained with a scanning electron microscope) are shown (with the scale being indicated for each figure) in the accompanying drawings described in more detail below.

The cross sections shown in the drawings are obtained by cutting perpendicularly through the thickness of the sheet with a razor.

The scanning electron microscope was of conventional type (e.g. Type JSM, Japan Electron Optics Laboratory Co., Ltd.). In preparation for viewing, the material is given a very thin uniform conductive coating, such as a metallic (gold-palladium) coating about 300 angstroms in thickness; the coating may be applied by evaporating the metal onto the specimen in a high vacuum (e.g. $10^{-4}$ mm. Hg absolute), the specimen being rocked while metal deposition is occurring, so as to distribute the metal uniformly over the surface, including the crevices, of the specimen. This coating serves to conduct away the electron charge which would otherwise accumulate on the surface of the specimen when it is exposed to the electron beam in the scanning electron microscope. In viewing the photomicrographs it should be borne in mind that the scanning type electron microscope has a great depth of focus (nearly 300 times that of the light microscope) such as about 300 microns at 100× magnification or 100 microns at 1000× magnification, enabling one to, in effect, see into the interiors of the pores.

FIG. 1 is a cross sectional view of a microporous sheet, before treatment according to this invention; this particular sheet is of unsupported, fleeceless elastomeric (black pigmented) polyurethane and has two integral layers; the upper layer 11 is thinner than the lower layer 12 and has a lower specific gravity.

FIG. 2 is a cross sectional view, at a higher magnification than in FIG. 1, showing the upper surface zone of the sheet; upper surface is indicated at 13.

FIG. 3 is a view of the upper surface 13, which has a dull gray appearance and is characterized by a number of open micropores.

FIG. 4 is a view, at high magnification of the central part of FIG. 3.

Figure 35:
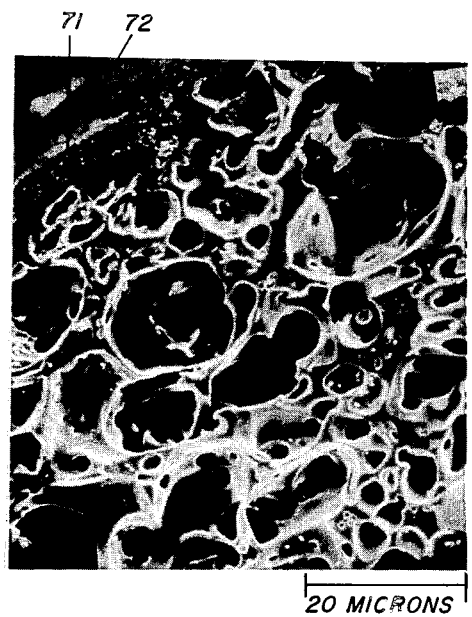

FIG. 5 is a cross sectional view of the upper surface zone of the sheet after it has been sprayed (while wet with a 50/50 methanol/water mixture) with a dilute pigmented solution of elastomeric polyurethane and dried. Comparison with FIG. 2 (which is to about the same scale) indicates the presence of a thin upper layer 14 in which there are very few pores of a size to be visible with the scanning electron microscope that is employed. In FIG. 5 the angle of viewing is such that one can see a portion of the upper surface 16, behind the plane of the cross section.

FIG. 6 is a view similar to FIG. 5 but at higher magnification.

FIGS. 7, 8 and 9 are top views of the upper surface 16 of the material shown in FIG. 5 at different magnifications; they indicate that the surface is micropebbly, with few pores of the same size as in FIGS. 3 and 4, but is otherwise not as smooth as the original surface.

FIGS. 10, 11, 12 and 13 are cross sectional views (at different magnifications) of the upper surface zone of the sheet after the sheet shown in FIGS. 5 to 9 has finally been sprayed while dry with a dilute pigmented solution of polyurethane and heated, giving a product which has a black lustrous but fine grained appearance like that of smooth fine black calf and shows a "break" like that of fine black calf; it will be seen that the upper surface has a distinct skin 17 in which any pores are so small as to be scarcely visible even at high magnification.

FIGS. 14, 15 and 16 are top views (at different magnifications) of the upper surface 18 of the lustrous sheet whose cross section is shown in FIGS. 10, 11 and 12; it will be seen that this upper surface is somewhat smoother than that of the material which had been sprayed while wet. FIG. 14 shows the presence of shallow craters 19 whose presence is also indicated in FIGS. 10, 11 and 12; the thin bright white lines at the upper surfaces shown in FIGS. 10, 11 and 12 appear to be the upwardly rising portions of the top surface which are behind the plane of the cross section; thus in FIG. 11 the crater appears to be at least about 100 microns in diameter and at least about 3 microns deep while the thickness of skin 17 is about 8 microns.

FIGS. 17 and 18 are cross sectional views of the upper surface zone of a sheet, originally like that of FIGS. 1 and 2, which has been sprayed while dry with a dilute pigmented solution of the polyurethane followed by heating to produce the lustrous calf-grained surface 21 but without the use of the intermediate layer shown in FIGS. 5 to 9; the sheet is glossy and has fine break and grain like fine calf leather. (FIGS. 17 and 18 are views taken at an angle of about 100° to the plane of the cross section, which plane as in all the other cross sectional views in the drawings, is at 90° to the surface of the sheet; the angle of viewing is such that a small portion of the uncut top surface of the material can be seen at a low angle, i.e. at an angle of some 5°.) It will be seen that the microporous surface shows a thin surface skin 22 (largely made up of fused material of the microporous sheet) some 5–12 microns thick; it will also be seen that there are saucer-like surface depressions 23.

FIG. 19 is a top view of the upper surface of a sheet, originally like that of FIGS. 1 and 2 which has been sprayed while dry with a dilute pigmented solution of the polyurethane followed by heating to produce the lustrous calf-grained surface, but without the use of the intermediate layer shown in FIGS. 5 to 9; the sheet is glossy and has a fine break and grain like fine calf leather; it will be seen that there are areas 29 where surface collapse of the porous structure has produced relatively large pores, exposing the sub-surface structure.

FIGS. 20 and 21 are cross sectional views of the upper surface zone of a sheet, originally like that of FIGS. 1 to 4, which carries a coagulated layer 31 which is thicker than that of FIGS. 5 to 9 but which has not been given the subsequent gloss producing treatment; this thicker coagulated layer is produced by multiple sprayings of the wet material; in this case the period between sprayings is such that after each spraying the non-solvent has time to "wick" up through the deposited coagulated layer so that the upper surface feels wet to the touch before the next spraying. It will be seen that cavities that are above 0.3 micron, in diameter (e.g. cavities 32 and 33) take up only a small portion of the volume of the coagulated surface layer.

FIGS. 22, 23 and 24 are cross-sectional views (at different magnifications) of the upper surface zone of a sheet (originally similar to that of FIGS. 1 to 4) which has been sprayed several times while wet with non-solvent, with a dilute pigmented solution of elastomeric polyurethane and then dried.

FIGS. 25, 26 and 27 are top views (at different magnifications) of the upper surface of the sheet of FIGS. 22 to 24.

FIGS. 28, 29 and 30 are cross-sectional views (at different magnifications) of the sheet of FIGS. 22 to 24 after it has been given a gloss-producing treatment by spraying it in the manner described in connection with FIGS. 10 to 12.

FIGS. 31, 32 and 33 are top views (at different magnification) of the upper surface of the sheet of FIGS. 28 to 30.

The microporous sheet material, prior to treatment in accordance with this invention has a water vapor transmission of above 100 g./m.²/24 hrs. (ASTM-E96-66-B). The invention has been found to be especially useful in the treatment of microporous sheet material which has a water vapor transmission of at least about 400 or 600 g./m.²/24 hrs. and whose surface has micropores of diameter above one or two microns, e.g. which has over 10,000 such micropores (of above one or two microns diameter) per square centimeter of surface area or, often, well over 100,000 such micropores per square centimeter. For example, the water vapor transmission of the material shown in FIGS. 1 to 4 is about 700 g./m.²/24 hrs. and its upper surface has about 400,000 micropores of over 2 microns diameter per square centimeter. The microporous upper zone of the sheet is generally at least about 20 microns in thickness. In the sheet shown in FIG. 2 the pore system (in the upper 60 microns of the sheet encompassed by FIG. 2) comprises cavities 36, having their maximum dimensions in the range of up to about 45 microns, connected by passages 37, which may have much smaller dimensions (e.g. maximum dimensions apparently as low as about two microns or so). The walls of the cavities may be very thin, such as the wall 38, it will be understood that other walls present in FIG. 2 are seen broadside, or at an angle, so that their thinness is not readily apparent. The thickness of the walls appears to be on the order of about 1 to 10 microns. Fine cavities 39 may also be present in the walls of the irregular cavities 36.

As will be seen from FIGS. 1 to 4 the volume of the sheets illustrated therein is largely taken up by cavities of generally rounded or compact (not highly elongated) shape, whose maximum dimensions (in this sample) are in the range of about 10 to 45 microns, connected by smaller passageways. It will be appreciated that in any cross-sectional slice some cavities will be cut along a diametral plane (so that their full diameters will be apparent), while others will be cut on one side or the other of a diametral plane (so that the apparent diameter of such cavities on the photograph may be considerably less than their actual diameters).

For the most preferred types of polyurethanes, the solvent in the liquid sprayed onto both the wet surface and, then, the dry surface, is DMF. This may be diluted, if desired; e.g. a mixture of 50 parts DMF, 20 parts cyclohexanone and 30 parts of acetone may be employed. Another suitable solvent mixture comprises DMF and up to about 1 part of acetone per part of DMF; the presence of the acetone lowers the viscosity in a desirable manner and a large part of the acetone evaporates during the spraying operation so that the droplets contacting the surface of the sheet material are considerably richer in the active solvent (DMF) and also in dissolved polymer, than the solution being sprayed. Whilst the invention is not dependent on any particular theory it is thought that the DMF in the deposited liquid is absorbed, in part, into the upper surface zone of the microporous sheet and aids in bonding the coagulated layer to the sheet, while at the same time the non-solvent is absorbed from the sheet into the deposited liquid layer whereby the solvent:non-solvent ratio in that layer is reduced and coagulation occurs. Other solvents having solvent power similar to DMF are N-methylpyrrolidone, N,N-dimethylacetamide, dimethylsulfoxide and hexamethylphosphoramide. It will be understood that the use of other solvents is within the broader scope of this invention.

The polyurethane content of the material that is applied to the wet surface is generally below about 35%; when the material is applied by spraying its polyurethane content is generally below about 15%, e.g. 1, 2, 3, 5, 8 or 10%, while higher concentrations (e.g. 15–25%) may be used when the material is applied by printing. The concentration of polyurethane material in the gloss producing solution sprayed onto the dried surface is generally below about 15% e.g. 1, 2, 3, 7 or 10% and it will be understood that this solution may be free of polymer.

The polyurethane in the coating solution is an elastomeric polyurethane. In one preferred embodiment the thermoplastic polyurethane material present in the coating is of substantially the same type as that constituting the microporous sheet, such polyurethanes are preferably aromatic, and are described in greater detail below.

In another preferred embodiment the solution (and particularly the one used to make the intermediate coagulated layer) contains a polyurethane material which may differ from that of the microporous surface zone on which it is deposited in such respects as for example, modulus of elasticity. For instance the coating solution may contain a polyurethane which may be made from an aliphatic diisocyanate, such as hexamethylene diisocyanate or tetramethylene diisocyanate, and the polyurethane may itself be substantially free of discolouration and resistant to oxidation and development of colour and may impart improved low temperature flex resistance.

An antioxidant and/or a stabilizer against deterioration by ultraviolet light may also be included in the coating solution.

The coating solutions preferably contain a dispersed pigment. The ratio of dispersed pigment to polyurethane in the solution being coated is usually within the range of about 1:50 to 1:1 or even 1:0.5, preferably about 1:1 to 1:10, e.g. 1:2 or 1:3, or (for carbon black) 1:10 or 1:5.

In one embodiment the pigment is black (e.g. carbon black) and the microporous sheet being sprayed contains a black dye or pigment. Examples of black pigments are carbon blacks (such as the channel black known as "Excelsior" sold by Columbia Carbon or "Superba" other channel for furnace blacks, e.g. Columbian Carbon's Raven 11, Raven 15 and Raven 30, or Monsanto's (#1 lampblack). Other pigments may be used, such as brown pigments (e.g. Mapico Brown 422 of Columbian Carbon, or combinations of Red Iron Oxide R. 8098 and Yellow Iron Oxide LO 1888B, both supplied by C. K. Williams & Co.). Still other suitable pigments are titanium dioxide, DuPont's Phthalocyanine Blue BT 284D, Phthalocyanine Green GT 674D, Monastral Red RT 790D, Chloride White R. 900, Monastral Scarlet RT 787D, Harmon Bon Maroon MB 13 and Interchemical Vat Yellow 212896. The pigment may be supplied as a masterbatch containing, e.g. 50% pigment in a thermoplastic resin compatible with the polyurethane (such as polyvinyl chloride or lacquer type cellulose nitrate).

A wide variety of non-solvent may be used to wet the microporous sheet. Water, alone, is suitable. Methanol alone is also suitable but has a tendency to evaporate so rapidly that the surface of the sheet becomes substantially dry very rapidly unless special precautions are taken. Mixtures of water and methanol (e.g. in 3:1, 1:1 or 0.3:1 ratio) are suitable, as are mixtures of water and isopropanol. The use of non-solvents of higher or lower volatility than water, e.g. such alcohols as hexanol-1; 2-ethylhexanol; butanol; ethylene glycol or other glycol is also within the broader scope of the invention. The non-solvent need not be applied specially for this purpose. Thus one may use the water wet sheet obtained as a result of the leaching step (to be described below) used in its manufacture, or one may use a sheet which has been dyed in a methanol or isopropanol water dyestuff bath and which still carries those non-solvents. The non-solvent preferably has little if any swelling effect on the polyurethane material of the sheet and the wetting of the microporous sheet material therewith does not damage the sheet material, which returns to substantially its original size, shape and properties (e.g. water vapour transmission) on removal (e.g. evaporation) of the non-solvent. Thus, in a test of the swelling power of 100% methanol (under the same conditions as are suitable for use in the process of this invention) an unpigmented polyurethane sheet used as the starting material in Example 1 is immersed in a bath of methanol at room temperature for 3 hours; its length and width each increases by less than about 10% (e.g. by about 5–7%) and returns to its original value on drying.

It is surprising that the coagulated layer applied to a wet sheet adheres very well to that sheet, even in grueling flex tests of the product at low temperatures (e.g. tests with a SATRA flex tester (STM 101–TM 1032) in an air atmosphere maintained at minus 12° C.). Thus good adhesion has been obtained with wet sheets containing some 50% or 100% (based on their dry weight) of non-solvent.

There is of course a level of wetness at which the adhesion is poor, e.g. when one uses a sheet containing, say 200% (based on its dry weight) of water. This level is easily determined by simple experiment with any particular sheet, particular non-solvent, and particular spray solution.

It has been found desirable to have the sheet thoroughly wetted across its entire area, and preferably throughout its entire thickness, length and width, in order to avoid any tendency for the surface effect to be uneven. This uniform, thorough wetting, can be facilitated by prolonged soaking, use of a wetting agent and/or use of mechanical means such as pressure rolls (squeeze rolls) to force the non-solvent through the interconnecting pores of the microporous sheet. Any method effective to achieve this clearly taught thorough wetting can be used. Best results have been obtained by immersing the sheet in a bath of the non-solvent and then passing it through squeeze rolls set to provide a predetermined amount of retained liquid. There should be enough water present in the sheet to effect coagulation of the applied coating. Thus, when the coating solution contains more polyurethane and correspondingly less active solvent, it may be more practical to leave less non-solvent in the sheet; e.g. one may leave about 30% water in the sheet and print onto the wet sheet a coating containing about 15% polyurethane, about 8% pigment and about 77% DMF.

The coagulated layer may be relatively thin, e.g. about 2 microns, or considerably thicker, e.g. 10, 20, 30 or even 75 or 200 microns in thickness. Preferably the coagulated layer is less than 20 microns in thickness. The layer of a polyurethane solution (in DMF for example) applied to the wetted sheet is generally of such thickness that it appears initially as a liquid glossy continuous layer and stays glossy for some minutes after deposition, then becoming duller owing to transport of non-solvent up through the deposited layer. The thicker layers are generally built up in a series of spraying stages. It has been found that this can be accomplished without rewetting the sheet, but for some thicknesses there should be some time allowed, between spraying stages, so that the non-solvent in the base sheet may penetrate through (or "wick" through) the deposited layer until the upper surface of the deposited layer is about to turn dull, or has already become dull, or has become moist (to the touch) with non-solvent. It has been found that dulling of the liquid layer can be accelerated by blowing warm or hot air (e.g. at about 50° C). onto its upper surface; one possible explanation is that this heating accelerates diffusion of water from the underlying sheet into the deposited layer to promote the coagulation or precipitation process; desirably such heating is effected after the deposited layer has had an opportunity to flow out somewhat over the surface of the underlying sheet (e.g. some 15 to 500 seconds after deposition of the layer).

The spraying onto the wet sheet is conveniently carried out at room temperature (e.g. 20–25° C.) but higher or lower temperatures may be used.

The coagulated layer has also been found to be capable of effectively covering the microporous sheet so that the colour of the latter does not show through, even though there is very little pigment (or no pigment) in the full layer. This covering power can be attributed to the existence of light scattering interfaces (which may be gas-polymer interfaces) in the coagulated layer. Much of this covering power is retained even after the final gloss producing treatment.

By the practice of this invention it has also been possible to obtain products which have very high resistance to flexing at low temperatures.

As previously mentioned, instead of applying the solution of the polyurethane material by spraying, it can be applied in other ways, as by printing it with a gravure roll having a very fine pattern.

A particularly suitable technique for applying the pigmented polyurethane solution to the sheet is by intaglio printing operations, using a relatively viscous solution in a liquid which is a solvent for the polyurethane material of the base sheet. The pigmented solution may be placed on an intaglio printing plate having a great many closely, and uniformly spaced tiny depressions or cells, and doctored thereon so that it fills the depressions and is removed from the raised intermediate areas; the upper surface of the sheet (which sheet is wet with a non solvent) is then brought into contact with the printing plate and pressed against it with sufficient pressure to transfer the solution from the depressions to the sheet. This pressure is preferably considerably lower than that which will physically express the non solvent from the sheet and thus cause coagulation of the solution within the depressions, thereby clogging the latter. For instance when, as in the preferred procedure, the sheet is saturated with non solvent and then squeezed to express excess non solvent before the pigmented solution is printed onto the sheet, the pressure used for the printing operation is considerably less than that used for the previous squeezing step. It is most preferable to repeat the printing step, so as to insure adequate coverage of the surface.

A less dull pigmented layer, which may even have some gloss, may be produced by using a sheet of lower non solvent content. Thus after the first printing step producing a dull deposit the non solvent content of the sheet may be reduced so that the second printing step produces a semi glossy layer. A sheet having such a layer is useful for many purposes, particularly when it is pressed or embossed to produce a shiny surface as described herein.

In the gloss-producing spray treatment, best results have been obtained by spraying with a fine mist in which the droplets reaching the surface are less than 50 microns in diameter (e.g. their diameters are within the range of 1 to 30 microns). As previously mentioned it is desirable to heat the surface of the solvent carrying surface of the sheet during the gloss producing treatment and a hot air blast may be used for this purpose; the temperature of this blast at a point just above the surface of the sheet may be, for example, in the range of 40–150° C. (e.g. 80° C.).

In accordance with another aspect of this invention the sheet material carrying the coagulated layer of pigmented polyurethane is pressed against a solid surface and heated to impart a grained effect, a glossy effect or both. In one embodiment the upper surface of the coagulated layer is pressed while hot and in contact with a smooth protective film. The film adheres to the surface, but can be easily stripped therefrom as is disclosed for example in Bateman U.S. Pat. 2,801,949 of Aug. 6, 1957. A heated embossing roll is preferably used to apply the pressure, with the hot surface of the embossing roll being in contact with the film. The film may be of the type described by Bateman, a film of polyethylene terephthalate being particularly suitable. While the use of a smooth protective film has thus far given products of highest gloss like patent leather the pressure may be applied directly by, for example, the polished, or grained, surface of the heat embossing roll.

The process makes it possible to obtain materials having a highly uniform and reproducible surface appearance. By using an embossing roll having a shallow grain (or no grain at all) one can produce shiny material having the appearance of a patent leather with a great depth of colour, that is, like a patent leather which has had many clear topcoats; this result is obtained without applying any topcoats whatsoever. By using an embossing roll having a deeper, more abrupt grain pattern (such as the kid grain to be described below) in the process of this invention one can produce a decidedly grained (and shiny, if desired) material of very attractive appearance.

When one attempts to carry out the hot pressing process on a pigmented material having the microporous surface, without the overlying coagulated layer of elastomeric polyurethane, a product of much less desirable properties is obtained, For instance, the colour of the pressed surface varies from run to run, and even within a run. This colour variation may be caused by small variations in the temperature or pressure of the embossing roll. In contrast when the polyurethane sheet carries the aforementioned pigmented coagulated layer such variations do not materially affect the surface appearance.

FIGS. 34 and 35 are cross-sectional views, at different magnifications, of the upper portion of a sheet material (originally like the sheet material of FIGS. 1 to 4) to which there has been applied (by printing twice with a fine-grained intaglio plate) a pigmented solution of elastomeric polyurethane in N,N-dimethylformamide (DMF) while the sheet material is wet with water, the whole being thereafter dried. The line along which the upper surface intersects the plane of the cross-section is designated by reference number 71.

Figure 36:
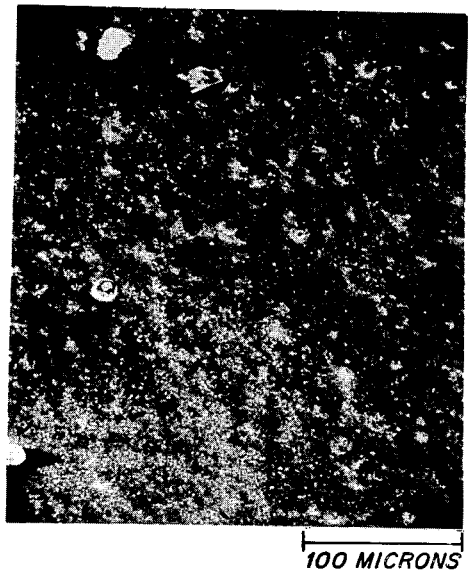
Figure 37:
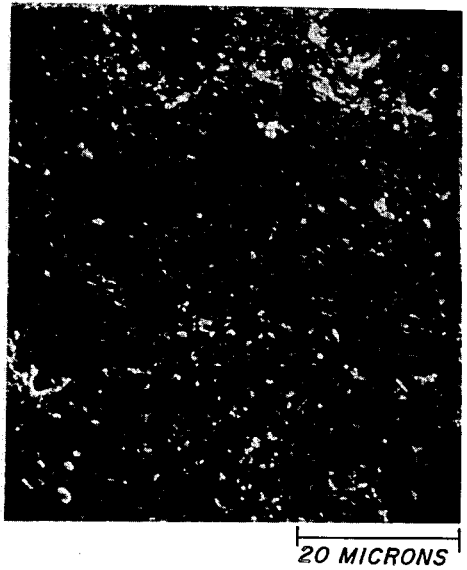

FIGS. 36 and 37 are top views, at different magnifications, of the material of FIGS. 34 and 35.

Figure 38:
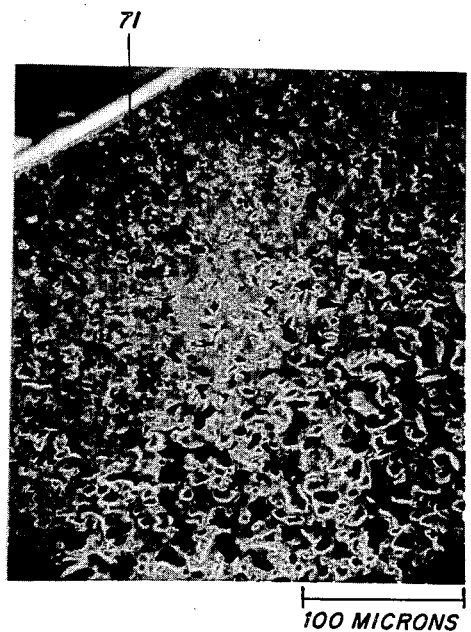
Figure 39:
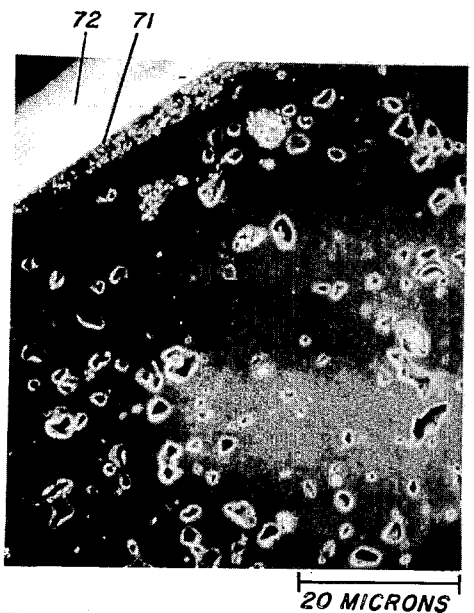

FIGS. 38 and 39 are cross-sectional views, at different magnifications, of the upper portion of the material of FIGS. 34 to 37 after it has been hot embossed, with a shallow-grained embossing roll, while covered with a smooth film of polyethylene terephthalate which is stripped off after the material has cooled. In FIG. 39 apparently owing to the unevenness of the upper surface of the material, one can also see, at a low angle, a portion 72 of that upper surface adjacent to the plane of the cross-section.

Figure 40:
Figure 41:
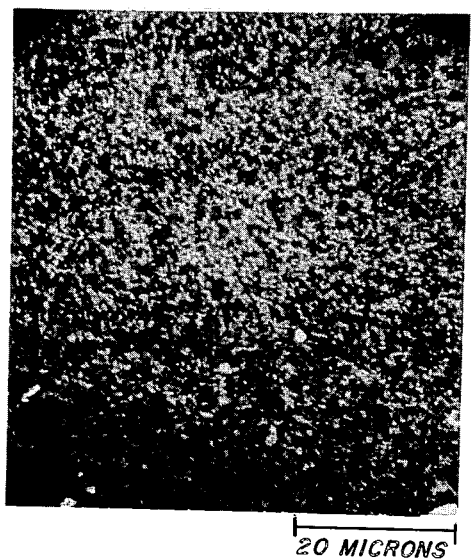

FIGS. 40 and 41 are cross-sectional views at different magnifications, of the top surface of the treated material of FIGS. 38 and 39. The white particles visible in the photomicrographs are believed to be stray particles of dirt or other foreign matter.

It will be seen that the material of FIGS. 34 to 37 carries a thin layer, about 4 to 8 microns in thickness, having very tiny discontinuities. The hot embossing treatment has compressed and deformed the upper portion of the sheet material, reducing the total thickness of the sheet material from its original value of about 0.075 inch to a final value of about 0.06 inch and greatly reducing its porosity, but a surface layer still appears to be visible (FIG. 39 indicates that it is some 3–4 microns in thickness).

By using more moderate pressing conditions (e.g. lower pressing temperature and/or pressing pressure and/or duration of pressing) the effect of the pressing on the pore structure of the sheet material may be reduced producing a product of better water vapor permeability. For example, one can produce highly glossy products whose water vapor permeabilities are about 600 g./m.$^2$/24 hrs. or more. Also, by using an embossing pattern such that the high embossing pressure is applied over only a small portion of the surface area of the sheet (such as a "kid grain" pattern) the major portion of the sheet area undergoes little or no distortion or collapse and the high moisture vapor permeability of the sheet is largely retained.

Prior to the hot pressing (embossing) the coagulated layer may be given a preliminary gloss producing treatment. This may be a spray treatment of the type described earlier in this specification; e.g. after drying, the top surface of the coagulated layer is sprayed with a fine mist containing a solvent for the said layer (and preferably pigmented and dissolved polyurethane) and then heated thus producing for instance a lustrous calf-grained material having a good break. Another preliminary gloss producing treatment is the deposition, from a solvent which does not attack the coagulated layer, of a layer of clear (or pigmented) polymer; thus a thin layer of a solution of an elastomeric polyurethane in tetrahydrofuran may be applied over a coagulated layer of tetrahydrofuran-insoluble polyurethane, or one may apply one or more of the "base finish" or "final finish" coats described in U.S. Pat. 3,481,767 or one or more of the coatings described in U.S. Pat. 3,501,326 in the thickness described in those patents. All these gloss-producing treatments may also be used without subsequent hot pressing.

Another aspect of this invention relates to the production of an "aniline" or tone-on-tone effect. It is found that the presence of the coagulated or precipitated pigmented layer makes possible the production of a product of outstanding tone-on-tone appearance, without the need for the application of an overall clear topcoat. As is well known in the finishing of natural leather, an aniline effect can be attained by unevenly spraying one colour onto another with the unevenly sprayed colour being deposited in a pattern of discreet, non-uniform areas, the macro-distribution of such areas being also non-uniform or blotchy. Uneven spraying, in the same type of spray pattern, may be used in the practice of this aspect of the invention. In one embodiment, the uneven spray is applied after the coagulated or precipitated pigmented layer has been given a gloss-producing treatment as described herein in which it is sprayed while dry with a fine mist containing a solvent for said layer (and preferably a pigment and dissolved polyurethane) and then heated producing a lustrous calf-grained material having a good "break"; an uneven spray of a darker coloured pigmented solvent (preferably also containing dissolved elastomeric polyurethane) is applied to this glossy material and similarly heated (as with a blast of hot dry air as described herein) to produce an attractive calf grained tone-on-tone material. In another embodiment the uneven spray of the darker coloured pigmented solvent is applied directly to the coagulated pigmented layer and similarly heated (as with the blast of hot air) after which the material is pressed in contact with a hot surface (preferably while covered with a preformed film, as described above) to produce a glossy tone-on-tone material; a grain preferably a relatively shallow grain such as a calf grain, may be embossed into the surface of the material during the pressing process, or the material may have substantially no embossed pattern, giving a very smooth patent leather effect. In both these embodiments it is believed that the attractive effect is due not only to the localized deepening of colour resulting from the simple deposition of the darker colour but is also due in part to a localized solvent attack on the surface. The colours used in this tone-on-tone process may be varied, as one example, an uneven spray of a dark brown or black is applied over a pigmented layer which is light brown, medium brown or tan. A typical product may have many darker areas which are about 100 to 300 microns in maximum transverse dimension and are spaced about 100 to 1000 microns apart.

In some cases a tone-on-tone effect with a more even, non-blotchy, appearance is desirable; in such cases the same procedure may be used but the spraying is done more evenly so as to deposit a relatively uniform overall pattern of spaced areas whose colour (or intensity of colour) is different from that of the layer on which they are deposited (the latter layer being visible, to the naked eye, between those spaced areas).

An "aniline" or tone-on-tone effect may also be obtained by depositing the spaced areas onto a sheet whose surface carries a non-solvent for the deposited material so that the latter is coagulated by the action of the non solvent. Thus, a material carrying a coagulated layer may be treated (while still wet with the non-solvent, or after drying and rewetting with the non-solvent) by tone-on-tone spraying of the top surface of the coagulated layer with a darker (or lighter) coloured pigmented solvent for the coagulated layer; the sprayed solvent preferably also contains dissolved elastomeric polyurethane. This type of treatment is particularly suitable when the deposited spaced areas are to cover a relatively large proportion of the surface area (e.g. 20%, 30% or more of the total area) since the product has better water vapour permeability than when such a large proportion of the area is covered by tone-on-tone spraying onto a dry base, as described earlier herein.

The hot pressing processes described herein are particularly useful with microporous sheet materials whose upper surface zone (prior to application of the coagulated layer) is of relatively low specific gravity (below about 0.5 and more particularly, below about 0.4 such as in the range of 0.3 to 0.4 e.g. about 0.35). Highly uniform results have been obtained with these materials.

FIGS. 42 and 43 are views of a sheet material (originally like the sheet material of FIGS. 1 to 4, but uncoloured) which has been sprayed twice while wet with water a pigmented solution of the elastomeric polyurethane in DMF. The amount of solution thus applied is insufficient, under the spraying conditions, to give full coverage. The cross-sectional view (of the upper surface zone) FIG. 42 is taken at a slight angle to the perpendicular, so as to show some of the features of the upper surface 51 as viewed at a low angle, as well as the coagulated layer 52. In the top view of the upper surface, FIG. 43, it will be seen that the upper surface is rough, and carries an irregular, and probably incomplete, covering of the coagulated material; relatively large lumps are also visible in the coating.

FIGS. 44–46 are views of the product of FIGS. 42 and 43 after it has been dried somewhat and given a tone-on-tone spray of darker coloured pigmented DMF solution of the polyurethane. FIG. 44 is a cross-sectional view of the upper surface zone of the sheet (the coagulated layer being indicated as 53 and the intersection of the plane of the cross-section with the upper surface of the sheet being indicated as 54. FIGS. 45 and 46 are top views at different magnifications. The product (which is within the broader scope of this invention) has very good water vapour permeability but its resistance to penetration by water is not very high and micropores above 1 micron in diameter (e.g. as indicated at 56) pass through its surface. FIGS. 47 and 48 are views of a product produced from the same untreated sheet as was used to make the product shown in FIGS. 42 to 46, but having a coagulated layer produced by two printings onto the wet sheet (rather than the two sprayings). A top view is shown in FIG. 47 and a cross sectional view of the upper surface zone is shown in FIG. 48 with the coagulated layer being indicated at 57.

FIG. 49 is a top view (at very high magnification) of the product produced (from the printed material of FIGS. 47 and 48) by a tone-on-tone spraying similar to that used in making the material shown in FIGS. 44–46.

FIGS. 50, 51 and 52 are views of a material similar to that of FIGS. 47 and 48 except that the material is printed three times (rather than twice) while wet.

FIGS. 50 and 51 are top views at different magnifications and FIG. 52 is a cross sectional view of the upper surface zone with the coagulated layer being indicated at 58.

FIGS. 53 to 56 are views of the material of FIGS. 48–50 after it has been given a tone-on-tone spray similar to that used in making the materials of FIGS. 44, 46 and FIG. 49. FIGS. 53–55 are cross sectional views of the upper surface zone at different magnifications and FIG. 56 is a top view. The views at highest magnification (FIGS. 52, 55 and 56) indicate the presence of "nodules" 59 of material in the coagulated layer. A study of the cross-sections in FIGS. 52 and 55 (as well as of other photomicrographs of related coagulated layers produced in accordance with this invention) indicates that these nodules may be regions having a different density from that of the matrix in which they are carried and that the cutting of the sample by the razor may push or scrape some of these nodules partly out of the matrix leaving visible pits or holes which can, in some cases, be seen (as at 60 in FIG. 55) adjacent to the corresponding partly displaced nodules. The nodules appear to have diameters on the order of about 0.1 to 0.5 micron (e.g. about 0.2–0.4 microns) and are visible even in the uncut material (see FIG. 49).

Figure 58:
Figure 59:
Figure 60:
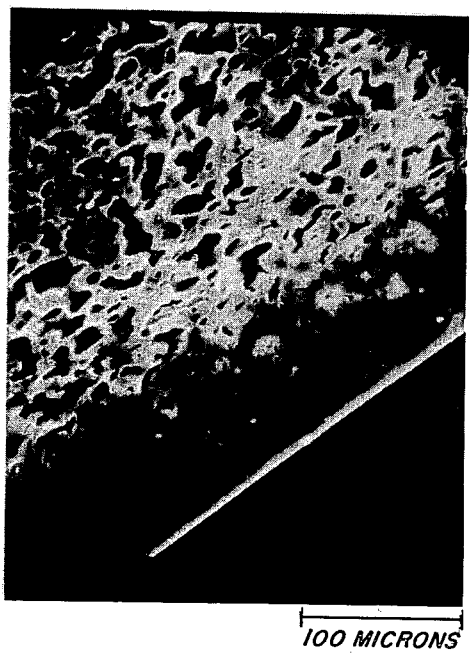

FIGS. 57, 58 and 59 are cross-sectional views at different magnifications of the upper surface zone of a material (originally like that of FIGS. 1–4 and having a tan colour before finishing) which has been sprayed twice with a brown pigmented DMF solution of the elastomeric polyurethane, while wet with water, then given a brown pigmented tone-on-tone spray (similar to that used in making the materials of FIGS. 44–46 and FIG. 49), then coated with a clear layer 61 of an aliphatic elastomeric polyurethane (applied in a solvent which does not attack the polyurethane of which the base material and coagulated layer are formed e.g. a mixture of tetrahydrofuran and cyclohexanone) and then hot pressed or embossed. The deformation and densification (of the portion of the base material underlying the coagulated layer) resulting from the pressing or embossing is evident in FIG. 57. The nodules 59 previously discussed are visible in FIG. 59.

Figure 61:
Figures 62, 63:
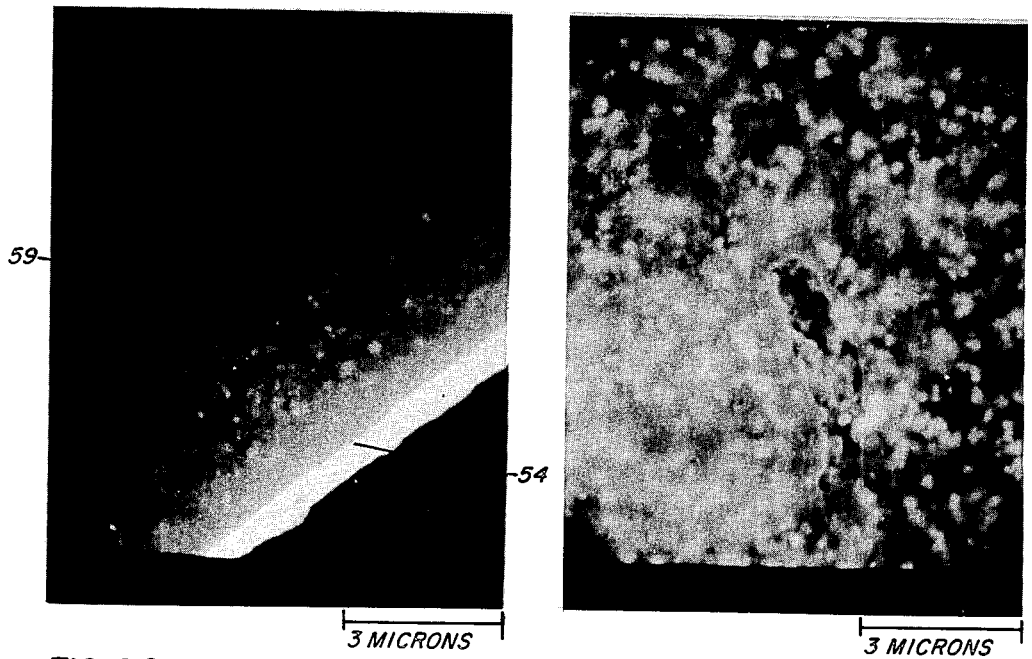

FIGS. 60 to 63 are views of a material which has been given a finishing treatment similar to that used in making the material shown in FIGS. 57–59, except that the clear layer of aliphatic polyurethane is omitted; FIGS. 61 and 62 are cross-sectional views of the upper surface zone while FIG. 63 is a top view. Here again one can see evidence of the nodules 59 previously mentioned.

In FIGS. 52, 57 and 62 as in FIG. 44 the line of intersection of the plane of the cross section and the top surface of the sheet is indicated at 54, and the white diffuse areas on the right side of that line appear to be caused by the fact that the sample was so oriented in the electron beam that some electrons also struck portions of the upper surface of the sheet.

It is within the broad scope of this invenition to use other methods for forming the coagulated water vapour permeable layer on the microporous sheet, such as other methods in which the polymer dissolving power of the liquid of the deposited layer decreases (as by decrease in the solvent:nonsolvent ratio or by change in temperature or both) during or after the application of the solution to the surface of the sheet whereby an adherent, water vapour permeable coagulated layer is formed on the sheet. The preferred process, in which the non solvent is supplied directly from the wet sheet to the overlying layer of solution is particularly suitable however; it has been found to be very easy to control and simple to operate.

Whilst the process is applicable to any material having a microporous surface zone in a preferred aspect of this invention the microporous sheet material is one which does not have its extensibility constrained by the presence of a reinforcing fabric such as a woven or non woven fibrous fabric. Throughout its thickness it consists essentially of non fibrous elastomeric polyurethane material. Unlike the conventional leather substitutes which have ultimate elongations of some 20–40% it can be stretched well over 50% (e.g. well over 100% and usually well over 200% e.g. 300% to 500%). Its thickness is at least 25 mils (0.63 mm.) e.g. about 30 to 100 mils (about 0.75 to 2.5 mm.) and preferably about 30 to 70 mils (about 0.75 to 1.8 mm.). The spraying with the solution containing polymer and pigment effects no substantial change in the thickness.

In one particularly preferred process the sprayed unreinforced microporous sheet, after passing under the blast of hot air (in the gloss producing treatment) is given a heat treatment under such conditions that the microporous sheet shrinks at least about 5% in area. Preferably the heat treatment is carried out at a temperature below the "collapse" temperature of the sheet and within 40° C. of said collapse temperature. (The collapse temperature is the temperature at which the sheet loses its porous structure, a phenomenon which is evidenced by the dry sheet becoming translucent or transparent.) In other embodiments this heat treatment is applied to the sheet after deposition of the dull layer and before the gloss producing treatment, or is applied to a finished sheet as the last step in the finishing process.

The heat treatment is conveniently carried out in a stream of hot air, e.g. in a suitable convection oven, while the sheet material is supported horizontally on a support which permits the desired planar shrinkage, such as a grate or a series of closely spaced rollers or an endless canvas belt. When the material being treated is in the form of a continuous sheet, little if any lengthwise tension is applied in order to move the material through the oven. The sheet material may, less desirably, be hung vertically, particularly when the width of the material is not great and the force of gravity resisting shrinkage is therefore small.

Instead of heating by convection from a hot gas the heat may be supplied by radiation (e.g. by infrared heaters or by dielectric heaters, such as those operating at radio frequencies) or by conduction, as by passing the material over hot rolls (e.g. conventional hot "cans") or through a hot liquid medium, in such a way that the planar shrinkage occurs.

The time (duration) and temperature of the heat treatment will depend on the particular polyurethane composition; thus it should not be so high as to melt the material or cause a collapse of its pores. The time and temperature of treatment should, however, be high enough to cause an area shrinkage of above about 5% e.g. in the range of about 5 to 40%. The temperature of the heat treatment is preferably at least 2° C. less than the collapse temperature of the microporous material, well within 40° C. of the collapse temperature and usually within 30° C. and often well within 15° C. of it (e.g. 5–15° C. less than the collapse temperature). The duration of the heat treatment is preferably relatively short, well below an hour, and usually well below 15 minutes. The optimum temperature and duration of treatment can be determined by simple experimentation and will of course depend in part on the efficiency at which the heat is transferred to and through the surface zones of the microporous material (which is itself a heat insulating structure). Generally in a convection oven the duration is over a minute e.g. about 3 to 5 minutes. The measurements of temperature in a convection oven are conveniently made by placing a thermocouple in the air very close to (i.e. just above) the upper surface of the sheet material.

In one particular preferred process, little if any change in the thickness of the material is observed during the heat treatment. In another embodiment, which is especially suitable when the microporous structure prior to heat treatment is of lower density (e.g. about 0.2–0.3 g./cm.$^3$) the treatment is such as to cause substantial decrease in thickness and consequent greater densification e.g. to provide a material having a density above 0.35 g./cm.$^3$ (such as 0.35 to 0.5). A treatment under conditions to reduce thickness may also be employed to make acceptable for certain uses an otherwise unacceptable sheet; for instance a material 1.1 mm. in thickness, which is too thick for use in place of the upper leather in ladies lined shoes (although acceptable for other uses) may be heat treated to reduce its thickness to an acceptable 0.8 mm. Preferably the sheets are substantially free of visible pores (macropores) both before and after the heat treatment.

The heat treated microporous sheet preferably has an apparent density in the range of about 0.35 to 0.7 and more preferably in the range of about 0.4 to 0.5 or 0.6 grams/cm.$^3$. The specific degree of shrinkage occurring during heat treatment depends in part on the structure of the material and its previous history. The apparatus density of the microporous sheet before heat treatment is preferably below about 0.5 or 0.6 e.g. in the range of about 0.35 to 0.55 grams/cm.$^3$. Typically the density of the polyurethane itself is about 1.2; it will therefore be apparent that in the neighborhood of ¼ to ½ of the volume of the microporous material is air.

The density of the microporous surface zone used in the practice of this invention is preferably in the range 2/12 to 7/12 especially 4/12 to 6/12 of the density of the solid material of which it is formed.

The elastomeric polyurethane material has an intrinsic viscosity of above 0.7, preferably above 0.8, and more preferably about 1 or more. The polyurethane is composed of segments having urethane linkages and intermediate longer segments which may for example be of polyester or polyether character. The urethane linkages are preferably derived from aromatic diisocyanates, such as diphenyl methane-p,p'-diisocyanate, and are thought to provide so-called "hard" segments in the polymer molecule, while the other segments (e.g. the polyester or polyether segments) are flexible or "soft." Polyurethanes of this type are known in the art. They may be made, for instance, by reacting a relatively low molecular weight hydroxyl-terminated polyester or polyether (e.g. of molecular weight below 6000, and preferably between 800 and 2500) with a low molecular weight glycol and a diisocyanate.

In making the polyurethane one may employ a polyester of a hydroxycarboxylic acid (e.g. a polycaprolactone) or a polyester of a glycol and a dicarboxylic acid (e.g. ethylene glycol adipate or 1,4-butanediol adipate) or a mixed polyester of these types of components. Examples of other dicarboxylic acids which may be used instead of, or in addition to, adipic acid, are succinic, pimelic, suberic, azelaic or sebacic acids or aromatic acids such as phthalic acid or terephthalic acid. Examples of other glycols which may be used to make the polyester are 1,6-hexanediol and 1,8-octanediol. The most useful polyesters are aliphatic polyesters in which the

groups are separated by aliphatic chains averaging about 3 to 6 carbon atoms in length.

Typical polyethers which are used to provide the soft segments for elastomeric polyurethanes are usually of aliphatic character. One type has the formula $H(RO)_nH$ where R is a divalent alkylene radical, such as tetramethylene or ethylene or propylene, and $n$ denotes the degree of polymerization.

The preferred diisocyanate used in making the polyurethane of the sheet material is diphenyl methane-p,p'-diisocyanate, but other diisocyanates may be used as such or in admixture therewith. Examples of other diisocyanates are 2,4-toluene diisocyanate, p,p'-diphenyl diisocyanate and tetramethylene diisocyanate.

The low molecular weight glycol referred to above acts as a chain extender. The preferred chain extender is tetramethylene glycol, but other chain extenders may be used as such or in admixture therewith. Examples of such other difunctional chain extenders are other dihydric alcohols such as ethylene glycol, hydroxy amines such as 2-amino-ethanol, diamines such as ethylene diamine, or water. The amount of chain extender is preferably such as to produce a thermoplastic product of high intrinsic viscosity.

In the preferred class of polyester polyurethanes made with diphenylmethane-p,p'-diisocyanate, those having nitrogen contents in the range of 4 to 5%, most preferably in the neighborhood of 4½% (e.g. 4.4–4.6%), have found to be particularly suitable.

For best results, the polyurethane material used to make the microporous sheet should have a melting point of at least 100° C., preferably above 150° C., e.g. about 170 to 200° C. (as measured by differential thermal analysis or differential scanning calorimetry). When formed into a smooth void-free thin film 0.2–0.4 mm. in thickness it should, for best results, have the properties described below; such thin films can be formed by careful casting of solutions of the polymer (e.g. a degassed 30% solution in dimethylformamide) followed by careful evaporation of the solvent in a dry atmosphere: a tensile strength of at least 210 kilograms per square centimeter (preferably at least 350, e.g. about 420 to 560), a percent elongation at break of at least 300% (preferably at least 400%, e.g. about 500 to 700%), an elastic modulus of at least 105 kilograms per square centimeter (preferably at least 350 e.g. about 560 to 770), a 100% secant modulus (stress divided by strain at 100% elongation) of at least 28 kilograms per square centimeter (preferably at least 84, e.g. about 110 to 134). These mechanical properties are measured by ASTM D882–67.

The polyurethane used to make the microporous sheet (again, tested as a thin film made as described above) should recover completely from a 5% elongation at room temperature (23° C.) but preferably does take on a permanent set (one measured for example as in ASTM D412–66) after a 100% elongation. This set is usually within the range of about 5 to 20%; for the best materials thus far employed it is in the range of about 10 to 20%, e.g. about 15%. A typical material shows a tension set of some 24–26% immediately on release of the clamps after being held at the 100% elongation for about 10 minutes while the "permanent set," which is here taken as the tension set measured 1 hour after the release of the clamps, is 14% (measured on a film specimen 1 cm. wide with a gage length of 5 cm. and a strain rate, for the 100% elongation, of 254% per minute). Preferably the material has a Shore hardness of at least 75A (more preferably about 90A to 60D), measured by ASTM D1706–67.

The polyurethane material used to make the microporous sheet or used in the sprays may be composed of polyurethane per se. It is also within the broad scope of the invention to use polyurethane materials which are blends of polyurethanes and other high polymers such as a vinyl chloride polymer (e.g. the vinyl chloride copolymers known as Bakelite VYHH or VAGH, containing vinyl acetate as a comonomer) or a rubbery copolymer of a conjugated diolefin and acrylonitrile (e.g. the butadiene-acrylonitrile copolymer known as Hycar 1031). The amount of such other high polymer is generally below 40% (e.g. 10% or 20%) of the total weight of the blend.

The preferred thermoplastic elastomeric polyurethanes are understood to have few, if any, chemical cross links and are believed to derive their properties primarily from hydrogen bonding forces rather than cross linkages. Their stress-strain curves are of the same general shape as those shown in FIG. 1 of the article by Stetz and Smith in Rubber Age, May 1965, page 74. While the polyurethane itself usually shows a tension set below 100%, as previously discussed, the preferred microporous polyurethane sheets generally recover completely with little, if any, permanent set (under standard dry conditions at room temperature) after being stretched 100%.

The microporous sheet (particularly after heat treatment) preferably has a percent elongation at break of above 50% (e.g. in the range of about 300 to 400% or more;) its tensile strength is preferably above 35 kg./cm.² (e.g. in the range of about 60 to 100); the stress needed to elongate it 5% is preferably above 2 kg./cm.² (e.g. in the range of about 4 to 9); and its slit tear strength (ASTM D2212–64) is preferably above 1 kg. per mm. thickness (e.g. in the range of about 2 to 5). Desirably the microporous sheet, before heat treatment, should have a percent elongation at break above 50%, more preferably 70% or higher and a tensile strength of at least 5 kg./cm.². Both before and after the heat treatment it should permit the passage of water vapor.

The "microporous" materials used in the process of this invention have pores invisible to the naked eye of a person with 20/20 vision. Such pores measure less than 100 microns in their maximum dimension (when a plane surface, such as the top or bottom of the material or a cross-section thereof is observed), and generally measure well below 50 microns in their maximum dimension.

One suitable method for making a microporous structure of the type shown in FIGS. 1–4 is by forming, as on a temporary support, a thick layer of a mixture of a leachable material (such as microscopic sodium chloride particles) and a solution of the thermoplastic polyurethane in a solvent (e.g. dimethylformamide) and treating the layer on the support with a liquid coagulant-leaching agent (e.g. water) which is a non-solvent for the polyurethane and at least partially miscible with the solvent, so as to coagulate the polyurethane into a microporous sheet; the treatment with the coagulant is continued until substantially all the solvent and leachable material are removed; the resulting water vapor-permeable flexible sheet material is dried and stripped from the temporary support. Other methods may be employed to make microporous structures.

The microporous sheet material to be treated in accordance with this invention may be colored, as by including a small amount of pigment (e.g. carbon black) in the polyurethane material forming the sheet or by dyeing the sheet with a solution of a solvent dye (such as an "Irgacet" dye, which may be of the type described in U.S. Pat. 2,551,056, dissolved in methanol). Also, the sheet may be dyed, in the same way, after the formation of the dull layer, or even after the formation of the glossy surface.

It is within the broader scope of the invention to use the sheet carrying the dull layer, as such, without treating it with the gloss-producing solvent, to obtain matte-finished upper leather substitutes. It is also within the broader scope of the invention to apply other surface treatments to the dull layer; for example an aqueous acrylic emulsion (such as Rohm & Haas "Primal" acrylic polymer latex E 510) may be deposited on the dull layer to give a glossy surface. The material, with or without the gloss-producing layer, may be embossed, on its upper surface, to produce special effects or to densify the upper surface.

The invention is most useful in making substitutes for shoe upper leather. In the manufacture of shoes, it is customary to cut the upper leather, usually with a die by machine, and to fit and assemble the parts of the upper together (including any doubler or lining that is to be used) as by stitching and/or cementing so as to ready the upper for lasting. After the insole has been secured to the bottom of the last, the upper is placed on the last, pulled over the wooden last so as to conform tightly to it, and attached to the insole. This "pulling over" is generally effected by mechanisms which grip, and pull, the upper at its edges, e.g. at the toe and sides.

During the fitting together of the upper, the edges of the upper leather are generally "skived," by cutting a bevel on the "flesh side" of the leather adjacent its edge and the skived edge is then cemented, folded back on itself and pressed in place, to give a neat finished top line or other edge.

Descriptions of the conventional methods for making shoes are contained in the 61 page publication "How American Shoes Are Made" 3rd edition, copyright 1966 by United Shoe Machinery Corporation.

Excellent shoes have been made with materials produced in accordance with this invention in place of the usual upper leather. The upper not only conforms unusually well to the last, without wrinkling or puckering, but also retains its lasted shape very well after removal from the last, particularly when the upper has been given the conventional type of heat setting treatment (e.g. setting with heat alone or moist heat) on the last. The material has very good skiving characteristics, particularly if it is wet with water prior to skiving. The shoes are comfortable and the uppers show very good wear resistance.

Unlike many shoes made with the conventional fabric-reinforced leather substitutes, there is no problem of fabric show-through or orange peel on lasting.

The following examples are given to illustrate this invention further. In the examples all pressures are atmospheric unless otherwise indicated. In the application all proportions are by weight unless otherwise indicated.

EXAMPLE 1

In this example the sheet material is a microporous elastomeric polyurethane sheet about 1.7 mm. thick and weighing about 740 grams per square meter. The sheet is composed of two integral layers of different densities, the upper layer being less dense than the lower layer. The sheet, which is originally of unpigmented polyurethane, is dyed by treating it at room temperature with a solution in methanol of a black water-insoluble methanol-soluble dyestuff for the polyurethane so that, after evaporation of the solvent, its upper surface has a gray matte appearance; the polyurethane is insoluble in, and resistant to swelling by, the dyebath, which contains a wetting agent to aid penetration of the bath into the microporous sheet.

The dried dyed material is then soaked in water at room temperature and then squeezed between rollers so that it retains about 50–100% of water based on the dry weight of the dyed sheet. While wet it is sprayed, on its upper surface, with a fine mist of a dilute pigmented solution containing 96% DMF, 3.6% dissolved elastomeric polyurethane and 0.4% finely divided, dispersed carbon black pigment (Excelsior carbon black having a particle diameter [arithmetic mean] of 16 m. a surface area of 230 square meters per gram, a DPG adsorption index of 25 and a pH of 3.7). The amount of solids thus applied is on the order of 10 grams per square meter. The sprayed product is then placed in a hot air oven to remove water and DMF by evaporation. The upper surface has a flat (non-glossy) appearance and seems relatively smooth and ungrained to the naked eye.

Thereafter the upper surface is sprayed twice with the same fine mist of dilute pigmented solution, each time depositing about the same amount of the solution as mentioned above. During spraying the sheet is moved continuously lengthwise and, directly after each of these two sprayings, the moving sheet passes under a blast of hot air directed at the upper surface, the sheet being fed under the hot blast so soon after the spraying that the upper surface still contains a large amount of solvent, the solvent-containing surface layer being substantially fused by the heat and a glossy effect being obtained. Directly after passing under the blast of hot air, the moving sheet (after each of these two sprayings) passes through a hot air oven to evaporate off the DMF. The upper surface of the resulting sheet is black and lustrous, but has a fine-grained appearance like that of smooth fine black calf and it shows a "break" like that of fine black calf.

When tested for waterproofness by the flexing test described below, the material withstands 250 cycles of flexing. Its water vapor transmission is about 500 g./m.²/24 hrs. The material after the first spraying (i.e. the spraying onto the water wet material, followed by drying) withstands only 50 cycles of flexing in the same waterproofness test and has a water vapor transmission of about 675 g./m.²/24 hours. (Fine calf leather has a transmission of about 800 g./m.²/24 hrs.)

In testing for waterproofness there is employed a flex machine similar to a SATRA Upper Material Flexer (STM101) having two spaced clamping devices arranged to hold opposite ends of the sample and to move towards each other to flex the sample and away from each other to return the sample to its unflexed condition. In the waterproofness test the sample is square, 2½ inches by 2½ inches and is folded in half with its finished top surface inside. The opposite ends are then placed in the two clamping devices so that the sample is now in the form of an envelope open at the top, with its ends sealed by the clamps (which press the two layers of the folded material together at said ends) and its closed bottom formed by the fold. The machine is then moved so that the clamping devices are brought towards each other; this naturally brings the clamp-sealed ends of the envelope closer together, flexing its sides outward away from each other, so that it is wide open at the top, and causing its bottom fold to flex upwardly midway between the ends. The envelope is then filled with distilled water so as to fully cover the upwardly flexed bottom fold. The flex machine is then operated at 60 flexes per minute, and the number of flexes required to cause penetration of water through the sample (as judged visually by a droplet of water appearing on the outside of the sample) is determined. In operation the clamping devices are cycled from a position 40 mm. apart to a flexing position at which they are about three mm. apart and back to their original position, etc.

EXAMPLE 2

Example 1 is repeated, using a similar microporous sheet made from a pigment-containing polyurethane (whose less dense upper layer contains 5% of finely divided carbon black, based on the weight of polyurethane, uniformly dispersed in the polyurethane material). The dry dark grey sheet is not dyed.

The sheet is passed through a 50/50 mixture (by volume) of methanol and water at room temperature and squeezed between rollers (i.e. padded) so that it picks up 60 parts of liquid per 100 parts of dry sheet. Its upper surface is then directly sprayed, while that surface is still wet to the touch, with a fine mist of a solution of 3.6% of polyurethane (of the same type as used to make the sheet) in DMF containing 0.36% of Excelsior carbon black to apply about 5 grams of solids per square meter to the upper surface of the sheet. The sprayed material is then passed directly under a blast of hot air, the air temperature near surface being about 90° C., and then into a hot air oven in which the sheet first encounters air supplied at about 120° C. and then air supplied at about 130° C. to dry the sheet thoroughly. The resulting sheet has a dull flat appearance.

The upper surface of the resulting dry sheet is then sprayed with a fine mist of the same solution as used in the previous spraying, then passed under the same blast of hot air and through the same hot air oven. This spraying and hot air treatment is repeated two more times; the total amount of solids applied in these three sprayings is in the neighborhood of 3 grams, or less, per square meter.

The product has an appearance and "break" like that of the product of Example 1. It has a high degree of waterproofness (it withstands over 500 flexes in the test) and good water vapor transmission (after the three spraying passes, dry, described above its water vapor transmission is about 290 g./m.²/24 hrs.; when only two such passes are employed the water vapor transmission is about 530 g./m.²/24 hrs.).

EXAMPLE 3

A dry, dyed, microporous sheet material, like that used in Example 1, is soaked in a 50/50 methanol/water mixture and squeezed between rolls so that the sheet retains some 80% of liquid (based on the dry weight of the sheet). The upper surface of the wet material is sprayed with a solution containing 3.5% elastomeric polyurethane and 0.35% finely divided carbon black (dispersed therein), in a liquid mixture of 48.1 parts DMF, 33.6 parts dimethylcyclohexanone, and 14.4 parts acetone. The sheet is then dried in a hot air oven for 1⅓ minutes at 130° C. and then 20 minutes at 90° C. to evaporate off all the volatile material. The dried material is then sprayed with a mist of a solution containing 1.5% elastomeric polyurethane and 0.15% finely divided carbon black (dispersed therein), in a liquid mixture of 49.7 parts DMF, 34.5 parts dimethylcyclohexanone and 14.8 parts acetone, then passed directly under a blast of hot air as in Examples 1 and 2 and then into a hot air oven at 130° C. for 1⅓ minutes. The total amount of solids deposited is 8 g./m.² of upper surface; of this 90% is polyurethane and 10% is carbon black.

EXAMPLE 4

Example 3 is repeated except that the pigment in the spray solutions is $TiO_2$. In the first spray (i.e. the solution sprayed onto the wet sheet) the pigment concentration is such that the PVC (pigment volume concentration) is 4.2%. In the gloss-producing spray the $TiO_2$ concentration is such that the PVC is 17%.

EXAMPLE 5

A pigmented two-layer sheet like that of Example 2 is immersed in water at room temperature and later squeezed between rolls so that the weight of retained water is 80% of the dry weight of the sheet. The sheet is then sprayed in a manner similar to that in Example 3 (the carbon black pigment in each spray being "Superba Black"). After the wet material is sprayed it is dried in a hot air oven at 106° C. for 20 minutes and is found to have increased in weight by 9.15 g./m.².

After the gloss-producing spray and hot air blast the material is passed through a hot air oven at 120° C. for 4 minutes. On testing for waterproofness the resulting glossy, calf-grain sheet withstands well over 500 (e.g. 3600) cycles of flexing. Its water vapor transmission is 300 g./m.²/24 hours.

EXAMPLE 6

Example 2 is repeated except that an aliphatic polyurethane is used, as the sole polyurethane, in each of the spray compositions. This polyurethane (Quinn polyurethane 9364) has a tensile strength of 401 kg./cm.², an ultimate elongation of 287%, a modulus at 5% elongation of 23 kg./cm.², a modulus at 100% elongation of 107 kg./cm.², and an intrinsic viscosity (measured in DMF at 25° C.) of 1.15; it is soluble (at 20% concentration) in DMF and tetrahydrofuran.

The spray compositions each contain 3.96% of the polyurethane and 1.6% of pigment (namely $TiO_2$ [rutile], the pigment being supplied as a masterbatch of 60% pigment concentration by weight, 12% vinyl chloride-vinyl acetate copolymer [vinyl resin "VYHH"] and 28% methyl ethyl ketone) in a liquid mixture containing 46.73 parts DMF, 32.17 parts cyclohexanone and 14.2 parts acetone.

The products of the foregoing examples are suitable for the manufacture of shoe uppers, as described previously. They can be made into shoes by stitching or by high frequency heat sealing or other heat- and/or solvent-cementing processes in which their thermoplastic, soluble upper and lower polyurethane surfaces are fused, dissolved of softened. Scrap material of the finished sheets can be readily redissolved (e.g. in DMF) and reused to make the microporous sheet or the spray solution or both.

The two-layer sheet material employed in the foregoing examples is made from a DMF solution of an elastomeric polyurethane containing dispersed micropulverized sodium chloride, the salt:polymer ratio for the mixture used for the upper layer being 3:1 and for the lower layer being 1.78:1. The two mixtures are cast one directly on top of the other (without intermediate treatment) onto a porous temporary support and the whole cast material is immersed in water to coagulate the polyurethane and extract the salt, and then dried. The two layers have a similar appearance when viewed in cross section with the electron scanning microscope, but the proportion of voids is, of course, higher in the upper layer. The less dense upper layer is about 0.2 to 0.6 mm. thick, for example 0.4 to 0.6 mm. thick, the density of the two-layer sheet is about 0.5 g./cm.³ and the density of the upper layer is about 0.4 g./cm.³.

The polyurethane in the foregoing examples is, unless otherwise noted, an elastomeric polyester polyurethane prepared by reacting Desmophen 2001 polyester (a hydroxyl-terminated polyester of 2000 molecular weight made from 1 mol butane diol-1,4, 1.13 mol ethylene glycol and 2 mols adipic acid), 1,4-butanediol (as a chain extender), diphenylmethane-p,p'-diisocyanate, and methanol (as a chain terminator), all dissolved in N,N-dimethylformamide ("DMF") under such conditions and in such proportions as to produce a 30% solution of an unreactive polyester polyurethane having an intrinsic viscosity of 1.0 (measured in DMF at 25° C.) a polyester content of 50.3% and a nitrogen content of 4.4%. For the dyeing of the sheet (as in Example 1), it is typically passed through a bath of methanol having dissolved therein 4% of nonionic surface active agent ("Igepal CO210") and 0.5% of a black dye ("Irgacet Black RL") being immersed in the bath for 38 seconds, then squeezed between rollers to express excess liquid, and passed through a hot air oven having an air temperature of 265° F. to drive off the methanol, being in the oven for 1½ minutes. In the process the dry weight of the material increases about 4% indicating that it contains about 0.5% of the dye.

The water vapor transmission figures given in some of the foregoing examples are determined with a Honeywell Water Vapor Transmission Rate Tester W 825 A 1035–1X, in which the sample is sealed between a lower chamber, maintained at 100° F. and 100% RH and an upper chamber. The upper chamber is initially flushed with warm dry air and then closed; when the relative humidity in the upper chamber rises to 9% (owing to water vapor passing from the lower chamber through a predetermined exposed area of the sample) a timer is started; the timer is stopped when the relative humidity in the upper chamber reaches 10%. The time required for the change from 9% to 10% RH is correlated for a series of samples with the water vapor transmission determined according to ASTM–E96–66–B and is reported as grams per square meter per 24 hours. Thus the correlations were as follows: 5 seconds, 450 g./m.²/24 hours; 6 seconds, 400 g./m.²/24 hrs.; 10 seconds, 300 g./m.²/24 hours; and 15 seconds, 200 g./m.²/24 hrs.

EXAMPLE 7

In this example the starting material is a microporous elastomeric polyurethane sheet like that used in Example 1 given above but undyed and otherwise uncolored.

The material (which is white in appearance, owing to its porosity) is soaked in water at room temperature (using vacuum impregnation to thoroughly and rapidly fill its pores with water). It is then passed between squeeze rolls to express some of its water so that it retains about 80% of water based on the dry weight of the dyed sheet.

While thus wet it is printed on its upper surface with closely spaced fine spots of a brown-pigmented solution of elastomeric thermoplastic polyurethane (the polyurethane being the same aromatic polyurethane as in the foregoing examples) which solution contains 17¼% solids, the balance being a mixture of 50% DMF, 35% cyclohexanone and 15% acetone; the solids content of the solution is made up of pigment and binder (polyurethane) in a ratio of 49:51; the pigment is very finely divided and is a mixture of red iron oxide (RBH red oxide 5436), yellow pigment (RBH yellow 5413) and a small amount of black pigment (RBH black 5404), to give a brown coloration. The viscosity of the solution is 25–30 seconds, measured with a #3 Zahn cup at 75° F. The printing is effected with an intaglio (rotogravure) roller having 100 tetragonally shaped cells (depressions) per inch (10,000 cells per square inch) which applies the pigmented solution to the surface of the wet sheet at the rate of one gallon of the pigmented solution per 750 square feet of the sheet.

The printed sheet is then passed quickly through an oven to flash off the more volatile solvent (acetone) so that the layer on the surface is quickly solidified and the resulting sheet (still wet with water) is then printed again, in the same way and at the same rate of application of the pigmented solution, and is thoroughly dried in an oven at 270° F. to fully remove the water, DMF cyclohexanone and acetone.

The resulting brown-surfaced product is then embossed while smoothly covered with a sheet of polyethylene terephthalate film 0.001 inch thick (1 mil untreated, glossy Mylar), by subjecting the film-covered sheet to a heated metal embossing roll (having a surface temperature of 420° F.) with the film in contact with the metal. To effect this the film-covered sheet is passed through the nip between the embossing roll and a rubber-covered unheated roll, the film-covered sheet being wrapped partly around the embossing roll (so that after passing through the nip it is subjected to the heat of the embossing surface while moving along with, and at the same speed as, said surface, being on contact with said surface for about 30 seconds), after which the film-covered sheet passes around a cool idler roll (with the back side of the sheet in contact with the idler roll) and thence to a windup roll.

During the process, pressure is constantly applied to urge the embossing roll towards the rubber-covered roll. This pressure deforms the rubber covering so that the nip is about ½ inch long (measured in the direction of movement of the sheet) and extends across the width of the sheet. The total force thus exerted on the 18 inch wide sheet material at the nip is about 5500 lbs.

The embossing surface has a very shallow calf grain pattern.

After leaving the embossing roll the sheet material is wound up in a roll and after it has cooled to room temperature the film is stripped off, leaving a glossy, but lightly grained, material.

By substituting a substantially smooth-surfaced roll for the embossed roll a glossy ungrained material is produced.

EXAMPLE 8

Example 7 is repeated, except that the pigmented solution is pigmented with carbon black and the resulting black printed material is then embossed in substantially the same way as described in Example 1, but using an embossing roll have a kid grain pattern and a surface temperature of 285° F. The resulting material has a shiny kid grain surface which though glossier than normal calf grain leather is not as glossy as the usual patent leather. Its water vapor transmission is about 840 g./m.$^2$/24 hrs.; before embossing it is about 1270 g./m.$^2$/24 hrs.

EXAMPLE 9

Examples 7 and 8 are repeated except that the material is printed black (as in Example 2) and the embossing roll has a very shallow calf grain pattern and a surface temperature of 320° F., using a higher pressure (about 11000 pounds total force) and a higher embossing speed. The resulting black product has a very lightly grained patent leather finish. Its water vapor transmission is about 650 g./m.$^2$/24 hrs.

The thermoplastic elastomeric polyurethane material used in the foregoing Examples 7-9 has a softening temperature (the temperature at which the material begins to stick to a conventional melting point block) of about 200° C. and a melting temperature in the neighborhood of 215° C.

In the foregoing examples, the calf grain embossing surface has an overall pattern of adjacent shallow troughs and bumps, the depth of grain (namely the difference in height between the top of a bump and the bottom of a trough, measured vertically, i.e. normal to the overall right cylindrical surface of the roll) being about 3 to 10 microns. The kid grain embossing surfaces has small spaced raised elongated ridges projecting about 85-105 microns from the surface of the roll, to emboss the sheet material to give the effect of a kid grain; these ridges at their bases are about 300-900 microns long and some 200-300 microns wide; their cross-sections are somewhat pear-shaped, being wider at the base than at the outermost portion.

Another embossing roll which may be used carries a "Morimer grain" pattern. More specifically the entire right cylindrical outer surface of the roll has small irregularly shaped scalloped or polyhedral hollows which are on the order of 1 mm. across whose depths are in the range of about 20 to 80 microns; the boundaries of the hollows are very thin (less than 0.1 mm. in width) and form a continuous network over the entire surface of the roll, which network is within the surface of an imaginary right circular cylinder coaxial with said roll; in other words there is a "raised" network of thin lines, all the spaces between the lines being scooped out to form shallow hollows. It will be apparent that the depth of the grain on the roll is small in comparison with the thickness of the compressible microporous sheet.

In the foregoing specific examples, the water contents of the DMF solutions applied to the sheet are, prior to contacting the wet sheet (e.g. as fed to the spray gun or intaglio roller or other coating device), well below the level that would cause the formation of a colloidal dispersion of the polymer (e.g. a colloidal dispersion of the type described in Holden U.S. Pat. 3,100,721). For instance the $H_2O$:DMF weight ration in the applied solution is well below 1:30, e.g. below 1:40 or 1:50 or 1:100 or 1:200 or 1:500.

In these examples the conditions of application and subsequent treatment of the solutions used to form the coagulated adherent layer are such that if there were substituted in the same process a dry non-pervious resistant base (e.g. a dry glass plate at 25° C. in place of the wet microporous sheet) the resulting film produced in the process would, we believe, be substantially free of pores of diameter above 0.3 micron.

In place of, or in addition to the pigment one may use a dye in the applied solutions. For instance, the solution used for the tone-on-tone spraying may contain a dye soluble in the DMF or a "transparent pigment" such as phthalocyanine blue, instead of an opaque pigment. One suitable class of dyestuffs are those sold as Acetosols, e.g. Acetosol Yellow 5GLS.

As indicated, the invention has its greatest utility in the treatment of unreinforced microporous polyurethane elastomer sheet material. In its broader aspects, however, the invention may be applied to microporous sheets which comprise a woven or non-woven fabric backing coated with, and usually impregnated with microporous polyurethane elastomer material. In this case the microporous layer overlying the impregnated fabric layer is usually relatively thin (e.g. below 25 mils (0.63 mm.) e.g. 0.2 to 0.4 mm.), although the total thickness of the sheet material (including the fabric body layer or reinforcement) is about the same as that of applicant's preferred unreinforced polyurethane sheet material. In one embodiment there may be formed on the fabric base layer a microporous layer of polyurethane material having a relatively low apparent density (e.g. a layer 0.5 mm. thick having an apparent density of 0.3 or 0.4 g./cm.$^3$).

In a preferred form of the invention the amount of material deposited as the coagulated layer is at least about 4 grams per square meter, e.g. about 5 to 15 g./m.$^2$.

The intrinsic viscosities given herein are determined in dry analytical grade DMF at 25° C.

The coagulated layer is often non-lustrous and (as indicated previously) its luster may be increased by a subsequent treatment under conditions which cause surface flow (such as treatment with solvent or treatment by hot pressing). A somewhat lustrous surface may be formed directly, even without such subsequent treatment, by controlling the conditions of formation of the coagulated layer (e.g. by controlling the proportion of non-solvent in the base sheet, the concentration of polymer in the deposited layer, the amount of material deposited, the temperature of heating the upper surface after deposition of the layer, etc.) so that coagulation by the action of the non-solvent occurs only, or primarily, in the lower portion of the deposited layer (i.e. the portion adjacent to the base sheet). Such conditions can be most readily determined by routine trials for each combination of base material and coating material. Typically the surface of the dried coagulated layer has a reflectance at 60° well below 40% e.g. in the range of about 0 to 35% when measured on a Gardner 60° gloss meter (ASTM Test No. D-523). For example, in the finishing of one microporous polyurethane sheet material (whose surface before finishing had a reflectance at 60° of about 13%) the reflectance at 60° from the top surface of the dried coagulated layer was 3%. After this layer was given a gloss improving spray treatment (as previously described, while the material was dry) the reflectance was about 18%; after subsequent embossing it was 22%; and after embossing in contact with a smooth polyethylene terephthalate sheet it was 73%. In another case, using somewhat different conditions (within the scope of this invention) in the formation of the coagulated layer, the 60° reflectance from the upper surface of the dried coagulated layer was about 30%.

For best control of the process it is best to apply the coagulated layer under conditions of controlled or low humidity, particularly when the solvent used to apply that layer is water-miscible (like DMF). Excellent results are obtained, however, without any special humidity control, e.g. by spraying the solution (onto the water-wet base) through the ambient air at such temperatures as 10° C., 20° C., 30° C. and 40° C., the dew point of the ambient air being, for example, in the range up to about 25° C. (e.g. 4° C., 10° C. or 20° C.).

As previously mentioned, the coagulated layer preferably contains a pigment and is preferably of such thickness as to substantially mask the underlying microporous surface zone on which said coagulated layer is deposited. The thickness of the coagulated layer is, as previously stated, preferably less than about 20 microns and the amount of material in the coagulated layer is preferably within the range of about 5 to 15 grams per square meter, more preferably at least 7 g./m.². In the preferred form of the invention the coagulated layer is resistant to colour change on change of hot pressing or embossing temperature. This is in marked contrast to the colour changes which result when it is attempted to colour the material by supplying the pigment in the original compressible microporous layer. In the latter case we have found that the final colour depends on the degree to which the microporous layer is compressed, which in turn depends on such conditions of embossing as the specific temperatures and pressures. These conditions can vary from run-to-run, or during a run, or even from point-to-point across the width of the sheet during an embossing run, with corresponding variations in colour. For instance in one case a sheet having a light brown coloured polyurethane microporous layer (containing brown pigment) was given a tone-on-tone spray, with a solution containing the same brown pigment, while dry, and was then embossed using an embossing surface having a temperature about 30° C. below the melting point of the polyurethane in one run, and about 20° C. below that melting point, in another run (e.g. for a polyurethane melting at about 177° C., the embossing roll temperatures were 149° C. and 159° C.). When the Adams colour differences was measured according to ASTM D2244-68 (using a Hunterlab Model D25 instrument) the following readings were obtained for the unembossed, lower temperature embossed and higher temperature embossed materials (listed in that order): L value (lightness index) 20.1, 19.4, 19.3; A value (green red index) 7.1, 6.2, 2.7; and B value (yellow blue index) 8.1, 7.5, 5.9; thus the E values, indicating colour change as compared to the original unembossed material, were 1.35 for the lower temperature embossing and 4.95 for the higher temperature pressing or embossing, showing the marked colour change for the latter. In contrast the practice of this invention makes it possible to make long continuous embossing or hot pressing runs, or runs at different times and in different places, with varying embossing or hot pressing temperatures and minimal control and obtain practically no visible colour change, so that embossing or hot pressing presents little or no colour matching problem.

The invention extends also to novel sheet materials. Thus according to one aspect of the invention there is provided a sheet material having at least a surface zone of microporous polymeric material the micropores of the said zone when viewed in a cross section perpendicular to the plane of the surface zone being largely micropores at least 1 micron across, the said surface zone being provided with an adhered layer of coagulated polymeric material which transmits water vapour and has at the most only a minor proportion of its volume occupied by pores which when viewed in a cross section perpendicular to the plane of the said adherent layer are above 0.3 micron across, the said adherent layer bridging and covering micropores which pass through the surface of the first said zone. As indicated, the micropores in said surface zone may be compact shaped and largely composed of micropores 5 to 50 especially 5 to 20, 30 or 40 microns across. In another form of the invention at least in the area of the surface zone next to the adherent coagulated layer the micropores of the surface zone are distorted to elongated form with their longest dimension generally parallel to the plane of the adherent layer. The surface zone is preferably at least 0.2 mm. thick, and in one particular preferred form of the invention the material is wholly microporous and is free of fibrous reinforcement and is at least 0.8 mm. thick.

As indicated previously, the process of this invention makes it possible to coat a microporous polyurethane surface zone with a vapor permeable layer of a polyurethane material which is soluble in strong solvents (which when applied in the absence of nonsolvent will attack the material of said zone) but is insoluble in weaker solvents. Thus the applied polyurethane may be soluble in DMF but insoluble at 5% concentration by weight at 20° C. in tetrahydrofuran, and in the solvents of U.S. Pat. No. 3,481,767 such as in a 50/50 by weight toluene/ethanol mixture, in a 50/50 by weight benzene/methanol mixture, dichloro ethane, benzyl alcohol, a 50/50 by weight methylene chloride/diethylene glycol ethyl ether mixture, and in a 50/50 by weight toluene/isopropyl alcohol mixture.

It is within the broader scope of the invention to use other organic high polymers and especially other water insoluble elastomeric materials in place of the polyurethane material for either the microporous layer or coagulated layer or both. Since many such polymers are soluble in DMF and insoluble in water, one may use the same solvent-non solvent combinations with those polymers. Those skilled in the art are however well acquainted with solvents and non solvents for the various polymers and will thus be able to choose the appropriate solvent and non solvent for any particular polymer in the light of the disclosure in the present application. Examples of types of other polymers for use in the microporous layer and in the coagulated layer are found in the previously mentioned U.S. Pats. Craven et al. No. 3,481,766 and Hochberg et al., No. 3,501,326.

It is understood that the foregoing detailed description is given merely by way of illustration and that variations may be made therein without departing from the spirit of the invention. The "Abstract" given above is merely for the convenience of technical searchers and is not to be given any weight with respect to the scope of the invention.

We claim:

1. A sheet material having at least a surface zone of microporous polymeric material the micropores of the said zone when viewed in a cross section perpendicular to the plane of the surface zone being largely micropores at least 1 micron across, said surface zone being provided with an adherent layer of coagulated polymeric material which transmits water vapour and is essentially free of pores which when viewed in a cross section perpendicular to the plane of the said adherent layer are above 0.3 micron across, the said adherent layer bridging and covering micropores which pass through the surface of the first said zone, said layer being up to 20 microns in thickness.

2. A material as claimed in claim 1 in which the material of said surface zone is elastomeric and the micropores in the surface zone are compact shaped and largely composed of micropores 5 to 50 microns across.

3. A material as claimed in claim 1 in which the material of said surface zone is elastomeric and in which at least in the area of the surface zone next to the adherent layer the micropores of the surface zone are distorted to elongated form with their longest dimension generally parallel to the plane of the adherent layer.

4. A material as claimed in claim 1 in which the surface zone is at least 0.2 mm. thick.

5. A material as claimed in claim 4 in which the material is wholly microporous and is free of fibrous reinforcement and is at least 0.8 mm. thick.

6. A material as in claim 4 in which said adherent layer when viewed in said cross section has nodules distributed therein, said nodules having diameters on the order of about 0.1 to 0.5 micron.

7. A material as in claim 1 in which the adherent layer is 2 to 20 microns thick.

8. A material as in claim 1 in which the surface zone and the adherent layer are of elastomeric polyurethane having an intrinsic viscosity of at least 0.7.

9. A material as in claim 8 in which the polyurethane of said adherent layer is soluble in dimethylformamide and insoluble at 5% concentration by weight at 20° C. in tetrahydrofuran.

10. Process for the treatment of microporous material which comprises providing a sheet material having a water vapor transmission of at least about 100 g./m.$^2$/24 hrs. and having at least one surface zone of microporous polymeric material, said surface zone being wet with a liquid, applying to the outer surface of said surface zone a solution of polymeric material in a solvent which attacks the polymeric material of said surface zone, coagulating said solution by the action of said liquid present in said surface zone while said solution is exposed to the atmosphere and removing said solvent by evaporation to form a layer up to 20 microns in thickness, said liquid being a non-solvent for the polymeric material of said solution and of said surface zone and being a coagulant for said solution whereby to coagulate said solution as a water vapor permeable layer on said outer surface, there being sufficient of said non-solvent in said zone to effect said coagulation.

11. Process as in claim 10 in which said surface zone has micropores which are over one micron in diameter passing through the outer surface of said zone.

12. Process as in claim 11 in which said sheet material has a water vapor transmission of at least about 400 g./m.$^2$/24 hrs. and the number of said micropores of over one micron diameter passing through said outer surface is over 10,000 per square centimeter.

13. Process as in claim 11 in which said polymeric materials are elastomeric.

14. Process as in claim 13 in which said surface zone and said solution contain elastomeric polyurethane.

15. Process as in claim 10 in which said surface zone is of microporous elastomeric polyurethane which is free of fibrous fabric support for a depth of at least 0.2 mm. and has, passing through its outer surface, over 10,000 micropores of over one micron diameter per square centimeter of surface, and the resulting water vapor permeable layer on said outer surface bridges and covers micropores which pass through said surface.

16. Process as in claim 15 in which said solution contains a pigment whereby to produce a colored coagulated layer on the outer surface of said sheet.

17. Process as in claim 16 in which, after the coagulation of said layer, the outer surface of the sheet is heated and pressed against a solid surface to compact said microporous surface zone and in which the color of said sheet remains substantially the same before and after the hot pressing step.

18. Process as in claim 17 including the step of applying, to said coagulated layer, spaced droplets of a solvent for said coagulated layer prior to the hot pressing step.

19. Process as in claim 18 in which said droplets are pigmented.

20. Process as in claim 17 including the step of applying to said coagulated layer, prior to the hot pressing step, a thin layer of a solution of unpigmented polymer in solvent which does not attack the coagulated layer, to form a clear coating on said coagulated layer.

21. Process as in claim 10 in which said solution contains elastomeric polyurethane dissolved in dimethylformamide and said non solvent contains at least one compound of the group consisting of water and an alcohol.

22. Process as in claim 21 in which said microporous zone is of elastomeric material that is attacked by dimethylformamide.

23. Process as in claim 10 in which the micropores of said zone when viewed in a cross section perpendicular to the plane of the surface zone are largely micropores at least one micron across and in which after the application of said solution to the surface of the microporous zone the applied material is heated by contact with a heating gas having a temperature of at least about 50° C.

24. Process as in claim 23 in which said heating is effected within about 15 to 500 seconds after application of said solution.

25. Process as in claim 24 in which said solution contains dimethylformamide as a solvent for the polymeric material of said solution.

26. Process as in claim 25 in which said surface zone and said solution are of elastomeric polyurethane and the amount of the solids of said solution deposited on said surface zone is, after removal of the solvent of said solution, about 5 to 15 grams per square meter.

27. A process as in claim 10 in which said surface zone is of microporous elastomeric polyurethane material with micropores which are over one micron in diameter passing through the outer surface of the said zone, and in which there is formed on the said outer surface, by said process, an adherent layer of elastomeric polyurethane material which layer transmits water vapour and is essentially free of pores whose diameter is above 0.3 micron, the said adherent layer bridging and covering the said micropores which pass through the outer surface of the said zone, the said polyurethane material of the said surface zone and the said adherent layer having an intrinsic viscosity of at least 0.7.

28. A process as in claim 27 in which the said adherent layer is about 2 to 20 microns thick.

29. A process as in claim 27 in which the said sheet material on which the adherent layer is to be deposited has a water vapour transmission of at least about 400 g./m.$^2$/24 hrs. and the number of the said micropores of over one micron diameter passing through said outer surface is over 10,000 per square centimeter.

30. A process as in claim 27 including the step of applying to the said adherent layer a solvent for the polyurethane thereof to form a fused glossy upper surface on the said adherent layer.

31. A process as in claim 30, in which said applied solvent contains dissolved polyurethane.

32. A process as in claim 30 in which said applied solvent is sprayed as a mist onto said adherent layer and the resulting sprayed surface containing the said solvent is then heated to fuse the said surface, the amount of the said solvent which is so applied and the degree of fusion being limited so that the water vapour transmission of the product is at least 100 g./m.$^2$/24 hrs.

33. A process as in claim 32 in which the said adherent layer and the said sprayed layer contain pigment.

34. A process as in claim 27 in which the solvent is dimethylformamide and the non solvent is selected from the group consisting of water, and alcohol miscible with dimethylformamide, and a mixture of water and at least one alcohol miscible with dimethylformamide.

35. A process as claimed in claim 34 in which the non solvent comprises methanol and water.

36. A process as in claim 34 in which the non solvent is water substantially free of the said alcohol.

37. A process as in claim 27 in which the weight of the said adherent layer is at least about 4 grams per square meter.

38. A process as in claim 37 in which the weight of the said adherent layer is about 5 to 15 grams per square meter.

39. A process as in claim 27 including the further step of heating the face of the sheet carrying said adherent layer and pressing said face with a solid surface at a temperature below the softening temperature of said polyurethane of said adherent layer to produce a glossy surface on said sheet material or increase the reflectivity of the said material.

40. A process as in claim 39 in which said adherent layer is pigmented and the said pressure is applied to a smooth strippable film in contact with the said adherent layer.

41. A process as claimed in claim 40 in which said pressing causes the said film to adhere to the said sheet material, the said processing including the step of stripping the said film from the said presesd sheet material.

42. A process as in claim 41 in which the said film is of polyethylene terephthalate.

43. A process as in claim 40 in which the said pressure is applied in a grain pattern.

44. A process as in claim 27 in which the solution which forms the adherent layer is pigmented and is applied, by rotogravure printing, as fine closely spaced spots.

45. A process as in claim 44 in which said sheet material carries the said non solvent when the said solution is printed thereon.

46. A process as in claim 27 in which the solution which forms the adherent layer is pigmented, the said process including the step of overspraying the said adherent layer in an uneven pattern with a second pigmented solution of a polymer in a solvent for the polyurethane of the said adherent layer, the said second pigmented solution being of a darker colour than the first-mentioned solution and being disposited in a pattern of discrete small non-uniform areas, the macro-distribution of such areas being also non-uniform.

47. A process as claimed in claim 46 in which the solvent of the said second solution lowers the melting temperature of the polyurethane of said adherent layer in contact therewith, the said process including the step of heating the sprayed surface while it contains the solvent of the said second solution to form fused areas on the said surface.

48. Process as in claim 27 in which said adherent layer is up to 20 microns in thickness and is pigmented, and including the step of applying to said adherent layer, after the removal of the solvent by evaporation, a solution of elastomeric polyurethane in a solvent therefor.

References Cited

UNITED STATES PATENTS

| | | | |
|---|---|---|---|
| 3,284,274 | 11/1966 | Hulslander et al. | 117—135.5 X |
| 3,501,326 | 3/1970 | Hochberg et al. | 117—135.5 X |
| 3,483,015 | 12/1969 | Fukushima et al. | 117—135.5 X |
| 3,100,721 | 8/1963 | Holden | 117—135.5 |
| 3,515,573 | 6/1970 | Japs et al. | 117—135.5 X |
| 3,481,767 | 12/1969 | Craven et al. | 117—11 X |
| 2,348,165 | 5/1944 | Buchanan | 117—163 X |
| 3,157,723 | 11/1964 | Hochberg | 264—314 X |
| 3,202,527 | 11/1965 | Stevens | 117—45 |
| 3,429,727 | 2/1969 | Hochberg | 117—11 |
| 3,510,344 | 5/1970 | Dunderdale | 117—135.5 X |

ALFRED L. LEAVITT, Primary Examiner

T. E. BOKAN, Assistant Examiner

U.S. Cl. X.R.

117—11, 38, 45, 47 A, 63, 64 R, 65.2, 72, 76 T, 135.5, 138.8 D; 161—159, DIG. 2